United States Patent
Chiou et al.

(10) Patent No.: US 10,216,555 B2
(45) Date of Patent: Feb. 26, 2019

(54) PARTIALLY RECONFIGURING ACCELERATION COMPONENTS

(71) Applicant: Microsoft Technology Licensing, LLC, Redmond, WA (US)

(72) Inventors: Derek T. Chiou, Austin, TX (US); Sitaram V. Lanka, Mercer Island, WA (US); Adrian M. Caulfield, Woodinville, WA (US); Andrew R. Putnam, Seattle, WA (US); Douglas C. Burger, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/752,785

(22) Filed: Jun. 26, 2015

(65) Prior Publication Data
US 2016/0378460 A1    Dec. 29, 2016

(51) Int. Cl.
| | | |
|---|---|---|
| G06F 11/00 | (2006.01) | |
| G06F 11/07 | (2006.01) | |
| G06F 11/14 | (2006.01) | |
| G06F 11/30 | (2006.01) | |
| G06F 8/656 | (2018.01) | |
| G06F 9/44 | (2018.01) | |

(52) U.S. Cl.
CPC .............. *G06F 11/00* (2013.01); *G06F 8/656* (2018.02); *G06F 11/0709* (2013.01); *G06F 11/0793* (2013.01); *G06F 11/1428* (2013.01); *G06F 11/3003* (2013.01)

(58) Field of Classification Search
CPC ............ G06F 8/30–8/78; G06F 9/44–9/44594
See application file for complete search history.

(56) References Cited

U.S. PATENT DOCUMENTS

| | | | |
|---|---|---|---|
| 5,600,845 | A | 2/1997 | Gilson |
| 5,684,980 | A | 11/1997 | Casselman |
| 5,748,979 | A | 5/1998 | Trimberger |

(Continued)

FOREIGN PATENT DOCUMENTS

| | | |
|---|---|---|
| CN | 101276298 A | 10/2008 |
| CN | 101545933 B | 9/2009 |

(Continued)

OTHER PUBLICATIONS

Emmert, John et al., "Dynamic Fault Tolerance in FPGAs via Partial Reconfiguration," pp. 165-174. (Year: 2000).*

(Continued)

*Primary Examiner* — Geoffrey R St Leger
*Assistant Examiner* — Christopher J Franco
(74) *Attorney, Agent, or Firm* — Ranjeev Singh; Singh Law, PLLC

(57) ABSTRACT

Aspects extend to methods, systems, and computer program products for partially reconfiguring acceleration components. Partial reconfiguration can be implemented for any of a variety of reasons, including to address an error in functionality at the acceleration component or to update functionality at the acceleration component. During partial reconfiguration, connectivity can be maintained for any other functionality at the acceleration component untouched by the partial reconfiguration. Partial reconfiguration is more efficient to deploy than full reconfiguration of an acceleration component.

17 Claims, 18 Drawing Sheets

(56) References Cited

U.S. PATENT DOCUMENTS

| | | | |
|---|---|---|---|
| 5,774,668 A | 6/1998 | Choquier et al. | |
| 5,828,858 A | 10/1998 | Athanas et al. | |
| 6,096,091 A | 8/2000 | Hartmann | |
| 6,104,211 A | 8/2000 | Alfke | |
| 6,256,758 B1* | 7/2001 | Abramovici | G01R 31/318519 714/724 |
| 6,326,806 B1 | 12/2001 | Fallside et al. | |
| 6,462,579 B1 | 10/2002 | Camilleri et al. | |
| 6,496,971 B1 | 12/2002 | Lesea et al. | |
| 6,526,557 B1 | 2/2003 | Young et al. | |
| 6,530,049 B1 | 3/2003 | Abramovici et al. | |
| 6,573,748 B1 | 6/2003 | Trimberger | |
| 6,874,108 B1* | 3/2005 | Abramovici | G01R 31/3016 713/401 |
| 6,915,338 B1 | 7/2005 | Hunt et al. | |
| 6,973,608 B1* | 12/2005 | Abramovici | G06F 11/142 714/5.1 |
| 6,996,443 B2 | 2/2006 | Marshall et al. | |
| 7,020,860 B1 | 3/2006 | Zhao et al. | |
| 7,036,059 B1 | 4/2006 | Carmichael et al. | |
| 7,111,224 B1 | 9/2006 | Trimberger | |
| 7,146,598 B2 | 12/2006 | Horanzy | |
| 7,224,184 B1 | 5/2007 | Levi et al. | |
| 7,240,127 B2 | 7/2007 | Dubreuil | |
| 7,263,631 B2 | 8/2007 | VanBuren | |
| 7,286,020 B1 | 10/2007 | O et al. | |
| 7,340,596 B1 | 3/2008 | Crosland et al. | |
| 7,382,154 B2 | 6/2008 | Ramos et al. | |
| 7,389,460 B1 | 6/2008 | Demara | |
| 7,444,551 B1 | 10/2008 | Johnson et al. | |
| 7,482,836 B2* | 1/2009 | Levi | H03K 19/17736 326/38 |
| 7,500,083 B2 | 3/2009 | Trivedi et al. | |
| 7,546,572 B1 | 6/2009 | Ballagh et al. | |
| 7,620,883 B1 | 11/2009 | Carmichael et al. | |
| 7,685,254 B2 | 3/2010 | Pandya | |
| 7,734,895 B1* | 6/2010 | Agarwal | G06F 9/3897 712/13 |
| 7,822,958 B1 | 10/2010 | Allen et al. | |
| 7,899,864 B2 | 3/2011 | Margulis | |
| 7,906,984 B1 | 3/2011 | Montminy et al. | |
| 7,925,863 B2 | 4/2011 | Hundley | |
| 7,953,014 B2 | 5/2011 | Toda et al. | |
| 8,018,249 B2 | 9/2011 | Koch et al. | |
| 8,018,866 B1 | 9/2011 | Kasturi et al. | |
| 8,046,727 B2 | 10/2011 | Solomon | |
| 8,054,172 B2* | 11/2011 | Jung | G06F 15/7871 340/3.1 |
| 8,117,497 B1 | 2/2012 | Lesea | |
| 8,117,512 B2 | 2/2012 | Sorensen et al. | |
| 8,127,113 B1 | 2/2012 | Sinha et al. | |
| 8,145,894 B1* | 3/2012 | Casselman | G06F 15/7871 713/1 |
| 8,159,259 B1 | 4/2012 | Lewis et al. | |
| 8,166,289 B2 | 4/2012 | Owens et al. | |
| 8,171,099 B1 | 5/2012 | Malmskog et al. | |
| 8,250,578 B2 | 8/2012 | Krishnamurthy et al. | |
| 8,368,423 B2 | 2/2013 | Yancey et al. | |
| 8,434,087 B2 | 4/2013 | Degenaro et al. | |
| 8,453,013 B1 | 5/2013 | Chen | |
| 8,516,268 B2 | 8/2013 | Woodall | |
| 8,554,953 B1 | 10/2013 | Sorensen et al. | |
| 8,635,571 B1* | 1/2014 | Goldman | G06F 17/5054 716/116 |
| 8,635,675 B2 | 1/2014 | Kruglick | |
| 8,803,876 B2 | 8/2014 | Bohan et al. | |
| 8,803,892 B2 | 8/2014 | Urbach | |
| 8,863,072 B1 | 10/2014 | Jahnke | |
| 8,867,545 B2 | 10/2014 | Viens et al. | |
| 8,901,960 B2 | 12/2014 | Takano et al. | |
| 8,910,109 B1 | 12/2014 | Orthner | |
| 8,924,907 B1 | 12/2014 | Jahnke et al. | |
| 8,997,033 B1* | 3/2015 | Hew | G06F 17/5054 716/116 |
| 9,032,343 B1* | 5/2015 | Goldman | G06F 17/5054 716/102 |
| 9,313,364 B2* | 4/2016 | Tanaka | H04N 1/32609 |
| 9,361,416 B2* | 6/2016 | Fine | G06F 17/5054 |
| 9,483,291 B1 | 11/2016 | Chen et al. | |
| 9,576,332 B1 | 2/2017 | Streete et al. | |
| 9,647,731 B2* | 5/2017 | Ardalan | H04B 7/043 |
| 9,652,327 B2 | 5/2017 | Heil et al. | |
| 9,774,520 B1 | 9/2017 | Kasturi et al. | |
| 9,792,154 B2 | 10/2017 | Burger et al. | |
| 9,819,542 B2 | 11/2017 | Burger | |
| 9,912,517 B1 | 3/2018 | Ramalingam et al. | |
| 9,983,938 B2 | 5/2018 | Heil et al. | |
| 10,027,543 B2 | 7/2018 | Lanka et al. | |
| 2002/0161902 A1 | 10/2002 | Mcmahan et al. | |
| 2002/0188832 A1 | 12/2002 | Mirsky et al. | |
| 2003/0033450 A1 | 2/2003 | Appleby-alis | |
| 2004/0081104 A1 | 4/2004 | Pan et al. | |
| 2004/0141386 A1 | 7/2004 | Karlsson | |
| 2005/0097305 A1 | 5/2005 | Doering et al. | |
| 2005/0120110 A1* | 6/2005 | Curran-Gray | H04L 43/0817 709/224 |
| 2006/0015866 A1 | 1/2006 | Ang et al. | |
| 2006/0143350 A1 | 6/2006 | Miloushev et al. | |
| 2007/0200594 A1* | 8/2007 | Levi | H03K 19/17736 326/38 |
| 2007/0210487 A1 | 9/2007 | Schroder | |
| 2007/0283311 A1* | 12/2007 | Karoubalis | G06F 17/5054 326/38 |
| 2008/0028187 A1 | 1/2008 | Casselman et al. | |
| 2008/0120500 A1 | 5/2008 | Kimmery et al. | |
| 2008/0164907 A1 | 7/2008 | Mercaldi-kim et al. | |
| 2008/0184042 A1 | 7/2008 | Parks et al. | |
| 2008/0270411 A1 | 10/2008 | Sedukhin et al. | |
| 2008/0276262 A1 | 11/2008 | Munshi et al. | |
| 2008/0279167 A1 | 11/2008 | Cardei et al. | |
| 2008/0285581 A1 | 11/2008 | Maiorana et al. | |
| 2008/0307259 A1 | 12/2008 | Vasudevan et al. | |
| 2009/0063665 A1 | 3/2009 | Bagepalli et al. | |
| 2009/0085603 A1* | 4/2009 | Paul | H03K 19/17764 326/8 |
| 2009/0147945 A1 | 6/2009 | Doi et al. | |
| 2009/0153320 A1* | 6/2009 | Jung | G06F 15/7871 340/506 |
| 2009/0182814 A1 | 7/2009 | Tapolcai et al. | |
| 2009/0187733 A1 | 7/2009 | El-ghazawi | |
| 2009/0189890 A1 | 7/2009 | Corbett et al. | |
| 2009/0210487 A1 | 8/2009 | Westerhoff et al. | |
| 2009/0254505 A1 | 10/2009 | Davis et al. | |
| 2009/0278564 A1 | 11/2009 | Dehon et al. | |
| 2010/0011116 A1 | 1/2010 | Thornton et al. | |
| 2010/0046546 A1 | 2/2010 | Ram et al. | |
| 2010/0057647 A1 | 3/2010 | Davis et al. | |
| 2010/0058036 A1 | 3/2010 | Degenaro et al. | |
| 2010/0076915 A1 | 3/2010 | Xu et al. | |
| 2010/0083010 A1 | 4/2010 | Kern et al. | |
| 2010/0106813 A1 | 4/2010 | Voutilainen et al. | |
| 2010/0121748 A1 | 5/2010 | Handelman et al. | |
| 2010/0174770 A1 | 7/2010 | Pandya | |
| 2010/0251265 A1 | 9/2010 | Hodson et al. | |
| 2011/0068921 A1 | 3/2011 | Shafer | |
| 2011/0078284 A1 | 3/2011 | Bomel et al. | |
| 2011/0080264 A1 | 4/2011 | Clare et al. | |
| 2011/0088038 A1 | 4/2011 | Kruglick | |
| 2011/0153824 A1 | 6/2011 | Chikando et al. | |
| 2011/0161495 A1 | 6/2011 | Ratering et al. | |
| 2011/0178911 A1 | 7/2011 | Parsons et al. | |
| 2011/0218987 A1 | 9/2011 | Branscome et al. | |
| 2011/0238792 A1 | 9/2011 | Phillips et al. | |
| 2012/0047239 A1 | 2/2012 | Donahue et al. | |
| 2012/0092040 A1 | 4/2012 | Xu et al. | |
| 2012/0110192 A1 | 5/2012 | Lu et al. | |
| 2012/0110274 A1 | 5/2012 | Rosales et al. | |
| 2012/0150952 A1 | 6/2012 | Beverly | |
| 2012/0260078 A1 | 10/2012 | Varnum et al. | |
| 2012/0324068 A1 | 12/2012 | Jayamohan et al. | |
| 2013/0055240 A1 | 2/2013 | Gondi | |
| 2013/0151458 A1 | 6/2013 | Indeck et al. | |
| 2013/0152099 A1 | 6/2013 | Bass et al. | |

(56) References Cited

U.S. PATENT DOCUMENTS

| | | |
|---|---|---|
| 2013/0159452 A1 | 6/2013 | de fuentes et al. |
| 2013/0177293 A1 | 7/2013 | Mate et al. |
| 2013/0182555 A1 | 7/2013 | Raaf et al. |
| 2013/0205295 A1 | 8/2013 | Ebcioglu et al. |
| 2013/0226764 A1 | 8/2013 | Battyani |
| 2013/0227335 A1 | 8/2013 | Dake et al. |
| 2013/0285739 A1 | 10/2013 | Blaquiere et al. |
| 2013/0297043 A1* | 11/2013 | Choi ............... G05B 15/02 700/3 |
| 2013/0305199 A1 | 11/2013 | He et al. |
| 2013/0314559 A1 | 11/2013 | Kim |
| 2013/0318277 A1 | 11/2013 | Dalal et al. |
| 2014/0007113 A1 | 1/2014 | Collin et al. |
| 2014/0055467 A1 | 2/2014 | Bittner et al. |
| 2014/0067851 A1 | 3/2014 | Asaad et al. |
| 2014/0092728 A1 | 4/2014 | Rivera et al. |
| 2014/0095928 A1 | 4/2014 | Ogasawara et al. |
| 2014/0115151 A1 | 4/2014 | Kruglick |
| 2014/0118026 A1 | 5/2014 | Aldragen |
| 2014/0208322 A1 | 7/2014 | Sasaki et al. |
| 2014/0215424 A1* | 7/2014 | Fine ............... G06F 17/5054 716/117 |
| 2014/0245061 A1 | 8/2014 | Kobayashi |
| 2014/0258360 A1 | 9/2014 | Hebert et al. |
| 2014/0267328 A1 | 9/2014 | Banack et al. |
| 2014/0280499 A1 | 9/2014 | Basavaiah et al. |
| 2014/0282506 A1 | 9/2014 | Cadigan, Jr. et al. |
| 2014/0282586 A1 | 9/2014 | Shear et al. |
| 2014/0310555 A1 | 10/2014 | Schulz et al. |
| 2014/0351811 A1 | 11/2014 | Kruglick |
| 2014/0380025 A1 | 12/2014 | Kruglick |
| 2015/0026450 A1* | 1/2015 | Adiki ............... G06F 9/4401 713/100 |
| 2015/0058614 A1 | 2/2015 | Degenaro et al. |
| 2015/0089204 A1* | 3/2015 | Henry ............... G06F 15/7892 712/221 |
| 2015/0100655 A1 | 4/2015 | Pouzin et al. |
| 2015/0103837 A1 | 4/2015 | Dutta |
| 2015/0169376 A1 | 6/2015 | Chang et al. |
| 2015/0186158 A1 | 7/2015 | Yalamanchili et al. |
| 2015/0199214 A1 | 7/2015 | Lee et al. |
| 2015/0261478 A1* | 9/2015 | Obayashi ........... H04N 1/00896 358/1.15 |
| 2015/0271342 A1 | 9/2015 | Gupta et al. |
| 2015/0339130 A1 | 11/2015 | Kruglick |
| 2015/0371355 A1 | 12/2015 | Chen |
| 2015/0373225 A1* | 12/2015 | Tanaka ............... H04N 1/32609 358/474 |
| 2015/0379100 A1 | 12/2015 | Vermeulen |
| 2016/0087849 A1 | 3/2016 | Balasubramanian et al. |
| 2016/0147709 A1 | 5/2016 | Franke et al. |
| 2016/0154694 A1 | 6/2016 | Anderson et al. |
| 2016/0202999 A1* | 7/2016 | Van Den Heuvel ........ G06F 9/4411 713/100 |
| 2016/0210167 A1 | 7/2016 | Bolic et al. |
| 2016/0306667 A1 | 10/2016 | Burger et al. |
| 2016/0306668 A1 | 10/2016 | Heil et al. |
| 2016/0306674 A1 | 10/2016 | Chiou et al. |
| 2016/0306700 A1 | 10/2016 | Heil et al. |
| 2016/0306701 A1 | 10/2016 | Heil et al. |
| 2016/0308649 A1 | 10/2016 | Burger et al. |
| 2016/0308718 A1 | 10/2016 | Lanka et al. |
| 2016/0308719 A1 | 10/2016 | Putnam et al. |
| 2016/0328222 A1 | 11/2016 | Arumugam et al. |
| 2016/0378460 A1 | 12/2016 | Chiou et al. |
| 2016/0380819 A1 | 12/2016 | Burger |
| 2016/0380912 A1 | 12/2016 | Burger et al. |
| 2017/0039089 A1 | 2/2017 | Xia et al. |
| 2017/0126487 A1 | 5/2017 | Xie et al. |
| 2017/0351547 A1 | 12/2017 | Burger et al. |

FOREIGN PATENT DOCUMENTS

| | | |
|---|---|---|
| CN | 101783812 A | 7/2010 |
| CN | 102377778 A | 7/2010 |
| CN | 102724478 A | 3/2012 |
| CN | 103246582 A | 8/2013 |
| CN | 103677916 A | 3/2014 |
| EP | 2199910 A1 | 6/2010 |
| EP | 2650786 A2 | 10/2013 |
| JP | 2005235074 A | 9/2005 |
| JP | 2013062566 A | 4/2013 |
| WO | 2013049079 A2 | 4/2013 |
| WO | 2013158707 A1 | 10/2013 |
| WO | 2013167326 A1 | 11/2013 |
| WO | 2013177316 A2 | 11/2013 |
| WO | 2014019428 A1 | 2/2014 |
| WO | 2015026373 A1 | 2/2015 |
| WO | 2015042684 A1 | 4/2015 |

OTHER PUBLICATIONS

Li, Zhiyuan et al., "Configuration Prefetching Techniques for Partial Reconfigurable Coprocessor," pp. 187-195. (Year: 2002).*

Lie, Wang et al., "Dynamic partial reconfiguration in FPGAs," pp. 445-448. (Year: 2009).*

Steiger, Christoph et al., "Operating Systems for Reconfigurable Embedded Platforms," pp. 1393-1407. (Year: 2004).*

Yin, Dong et al., "Customizing Virtual Networks with Partial FPGA Reconfiguration," pp. 57-64. (Year: 2010).*

Danek, Martin et al., "Increasing the Level of Abstraction in FPGA-Based Designs," pp. 5-10. (Year: 2008).*

Horta, Edson L. et al., "Dynamic Hardware Plugins in an FPGA with Partial Run-time Reconfiguration," Retrieved from "https://ieeexplore.ieee.org/document/1012647" pp. 343-348, [retrieved on Oct. 11, 2018]. (Year: 2002).*

Lysaght, Patrick et al., "Invited Paper: Enhanced Architectures, Design Methodologies and CAD Tools for Dynamic Reconfiguration of XILINX FPGAS," Retrieved from "https://ieeexplore.ieee.org/document/4100950" pp. 1-6, [retrieved on Oct. 11, 2018]. (Year: 2006).*

Bolchini, Cristiana et al., "TMR and Partial Dynamic Reconfiguration to mitigate SEU faults in FPGAs," Retrieved from "https://ieeexplore.ieee.org/stamp/stamp.jsp?arnumber=4358376" pp. 87-95, [retrieved on Oct. 11, 2018]. (Year: 2007).*

Heiner, Jonathan et al., "FPGA Partial Reconfiguration Via Configuration Scrubbing," Retrieved from "https://ieeexplore.ieee.org/document/5272543" pp. 99-104, [retrieved on Oct. 11, 2018]. (Year: 2009).*

Papadimitriou, Kyprianos et al., "Performance of Partial Reconfiguration in FPGA Systems: A Survey and a Cost Model," Retrieved from "https://dl.acm.org/citation.cfm?id=2068722" pp. 36:1-36:24, [retrieved on Oct. 11, 2018]. (Year: 2011).*

Rani, J. Sheeba et al., "FPGA Based Partial Reconfigurable Fir Filter Design," Retrieved from "https://ieeexplore.ieee.org/document/6779423" pp. 789-792, [retrieved on Oct. 11, 2018]. (Year: 2014).*

Harikrishna, et al., "A Novel Online Fault Reconfiguration of FPGA", In Proceedings of Indian Journal of Applied Research, vol. 3, Issue 8, Aug. 2013, pp. 195-198.

Kearney, et al., "Using Simulated Partial Dynamic Run-Time Reconfiguration to Share Embedded FPGA Compute and Power Resources across a Swarm of Unpiloted Airborne Vehicles", In Proceedings of EURASIP Journal of Embedded Systems, vol. 2007, Feb. 21, 2007, 12 pages.

Abel, et al., "Increasing Design Changeability using Dynamical Partial Reconfiguration", In Proceedings of 16th IEEE NPSS Real Time Conference, May 10, 2009, 7 pages.

Emmert, et al., "Online Fault Tolerance for FPGA Logic Blocks", In IEEE Transactions on Very Large Scale Integration (VLSI) Systems, vol. 15, Issue 2, Feb. 2007, pp. 216-226.

Paulsson, et al., "Exploitation of Run-Time Partial Reconfiguration for Dynamic Power Management in Xilinx Spartan III-based Sys-

(56) References Cited

OTHER PUBLICATIONS tems", In Proceedings of the 3rd International Workshop on Reconfigurable Communication-centric Systems-on-Chip, Jun. 2007, 6 pages.
"Secure Computing Architecture", Retrieved on: Feb. 23, 2015 Available at: http://www.syprisresearch.com/home/secure-computing-architecture.
Straka, et al., "Modern Fault Tolerant Architectures Based on Partial Dynamic Reconfiguration in FPGAs", In IEEE 13th International Symposium on Design and Diagnostics of Electronic Circuits and Systems, Apr. 16, 2010, pp. 173-176.
Conger, et al., "FPGA Design Framework for Dynamic Partial Reconfiguration", In Proceedings of the 15th Reconfigurable Architecture Workshop, Apr. 14, 2008, 8 pages.
Corbetta, et al., "Two Novel Approaches to Online Partial Bitstream Relocation in a Dynamically Reconfigurable System", In Proceedings of IEEE Computer Society Annual Symposium on VLSI, Mar. 9, 2007, 2 pages.
Putnam, et al., "A Reconfigurable Fabric for Accelerating Large-Scale Datacenter Services", In Proceedings of ACM/IEEE 41st International Symposium on Computer Architecture, Jun. 14, 2014, 12 pages.
Raaijmagers, et al., "Run-Time Partial Reconfiguration for Removal, Placement and Routing on the Virtex-II Pro", In Proceedings of International Conference on Field Programmable Logic and Applications, Aug. 27, 2007, 5 pages.
Kohn, Christian., "Partial Reconfiguration of a Hardware Accelerator on Zynq-7000 All Programmable SoC Devices", In Proceedings of Application Note: Zynq-7000 All Programmable SoC, vol. XAPP1159, No. UG1159, Jan. 21, 2013, 19 pages.
Rana, et al., "Partial Dynamic Reconfiguration in a Multi-FPGA Clustered Architecture Based on Linux", In Proceedings of IEEE International Parallel and Distributed Processing Symposium, Mar. 26, 2007, 8 pages.
Rehman, et al., "Test and Diagnosis of FPGA Cluster Using Partial Reconfiguration", In Proceedings of 10th Conference on Ph.D. Research in Microelectronics and Electronics, Jun. 30, 2014, 4 pages.
Gazzano, et al., "Integrating Reconfigurable Hardware-Based Grid for High Performance Computing", in the Scientific World Journal vol. 2015, Apr. 16, 2015, 14 pages.
"International Search Report and Written Opinion Issued in PCT Application No. PCT/US2016/038837", dated Sep. 16, 2016, 18 Pages.
Pereira, et al., "Characterization of FPGA-based High Performance Computers", Retrieved From:https://vtechworks.lib.vt.edu/bitstream/handle/10919/34483/PimentaPereira_KS_T_2011.pdf?sequence=1, Aug. 9, 2011, 134 Pages.
Rath, John, "Microsoft Working on Re-configurable Processors to Accelerate Bing Search", Retrieved From: http://www.datacenterknowledge.com/archives/2014/06/27/programmable-fpga-chips-coming-to-microsoft-data-centers/, Jun. 27, 2014, 3 Pages.
Saldana, et al., "TMD-MPI: An MPI Implementation for Multiple Processors Across Multiple FPGAs", In International Conference on Field Programmable Logic and Applications, Aug. 28, 2006, 6 Pages.
Schadt, et al., "Computational Solutions to Large-Scale Data Management and Analysis", In Journal of Nature Reviews Genetics, vol. 11, Sep. 2010, 11 Pages.
Slogsnat, et al., "An Open-Source Hyper Transport Core", in Journal of ACM Transactions on Reconfigurable Technology and Systems, vol. 1, Issue 3, Sep. 2008, 21 Pages.
So, et al., "A Unified Hardware/Software Runtime Environment for FPGA-Based Reconfigurable Computers using BORPH", In Journal of ACM Transactions on Embedded Computing Systems, vol. 7, Issue 2, Feb. 2008, 28 Pages.
Southard, Dale, "Best Practices for Deploying and Managing GPU Cluster", Retrieved from http://on-demand.gputechconf.com/gtc-express/2012/presentations/deploying-managing-gpu-clusters.pdf, Dec. 18, 2008, 17 Pages.
Stott, et al., "Degradation in FPGAs: Measurement and Modelling", In Proceedings of the 18th Annual ACM/SIGDA International Symposium on Field Programmable Gate Array, Feb. 21, 2010, Feb. 21, 2010, 10 Pages.
Stuecheli, Jeff, "Next Generation Power Microprocessor", In proceedings of Hot Chips: A Symposium on High Performance Chips, Aug. 2013, 20 Pages.
Sverdlik, Yevgeniy,, "Intel to Offer Hyper-Scale Operators Ability to Reconfigure CPUs on a Dime", Retrieved From: https://www.datacenterknowledge.com/archives/2014/06/19/intel-offer-hyper-scale-operators-ability-reconfigure-cpus-dime, Jun. 19, 2014, 3 Pages.
Tan, et al., "A Case for Fame: FPGA Architecture Model Execution", In ACM SIGARCH, Computer Architecture News, vol. 38, No. 3, Jun. 19, 2010, pp. 290-301.
Tan,, et al., "Datacenter-Scale Network Research on FPGAs", In Proceedings of the Exascale Evaluation and Research Techniques Workshop, 2011, 6 Pages.
Unnikrishnan,, et al., "Reconfigurable Data Planes for Scalable Network Virtualization", in IEEE Transactions on Computers, vol. 62, No. 1, Jan. 2013, 14 Pages.
Vanderbauwhede,, et al., "FPGA-accelerated Information Retrieval: High-Efficiency Document Filtering", In Proceedings of the International Conference on Field Programmable Logic and Applications, Aug. 2009, 6 Pages.
Vaz,, et al., "Deferring Accelerator Offloading Decisions to Application Runtime", in Proceedings of the International Conference on ReConFigurable Computing and FPGAs, Apr. 24, 1994, 8 Pages.
Wilson,, Richard,, "Big FPGA design moves to the cloud", Retrieved From: https://www.electronicsweekly.com/news/products/fpga-news/big-fpga-design-moves-to-the-cloud-2013-06/, Jun. 11, 2013.
Wilson,, Ron,, "Heterogeneous Computing Meets the Data Center", Retrieved From: https://systemdesign.intel.com/heterogeneous-computing-meets-the-data-center/, Aug. 4, 2014, 3 Pages.
Wittig, et al., "OneChip: An FPGA Processor With Reconfigurable Logic", In Department of Computer and Electrical Engineering,University of Toronto, Apr. 17, 1996, 10 Pages.
Yan, et al., "Efficient Query Processing for Web Search Engine with FPGAs", In Proceedings of the IEEE 20th International Symposium on Field-Programmable Custom Computing Machines, Jun. 14, 2014, 4 Pages.
Yin,, "Customizing Virtual Networks with Partial FPGA Reconfiguration", In Proceedings of the Second ACM SIGCOMM Workshop on Virtualized Infrastructure Systems and Architectures, Sep. 2010, 8 Pages.
"Accelium 3700 Coprocessor", Retrieved From http://drccomputer.com/downloads/DRC%20Accelium%203700%20Datasheet%20-%200ct%202013.pdf, Mar. 4, 2015, 1 Page.
"Altera and IBM Unveil FPGA-Accelerated Power Systems", Retrieved From: http://www.hpcwire.com/off-the-wire/altera-ibm-unveil-fpga-accelerated-power-systems/, Nov. 17, 2014, 5 Pages.
"Altera Programmable Logic is Critical DNA in Software Defined Data Centers", Retrieved From: http://newsroom.altera.com/press-releases/altera-microsoft-datacenter.html, Jun. 16, 2014, 2 Pages.
"An Introduction to the Intel Quickpath Interconnect", Retrieved From: http://www.intel.in/content/dam/doc/white-paper/quick-path-interconnect-introduction-paper.pdf, Jan. 2009, 22 Pages.
"An Introduction to the NI Lab View Rio Architecture", Retrieved From: http://www.ni.com/white-paper/10894/en, Jan. 28, 2015, 4 Pages.
"BEE4 Hardware Platform", Retrieved From: http://beecube.com/downloads/BEE42pages.pdf, Feb. 26, 2015, 2 Pages.
"Cisco UCS C240-M3 Rack Server with NVIDIA GRID GPU cards on Citrix XenServer 6.2 and XenDesktop 7.5", Retrieved From: http://www.cisco.com/c/en/us/products/collateral/servers-unified-computing/ucs-c-series-rack-servers/Whitepaper_C11-732283.pdf, Jul. 2014, 38 Pages.
"Cray XD1 Datasheet", Retrieved From http://www.carc.unm.edu/~tlthomas/buildoui/Cray_XD1_Datasheel.pdf, Mar. 4, 2015, 6 Pages.
"Final Office Action Issued in U.S. Appl. No. 14/717,788", dated May 2, 2017, 18 Pages.
"Final Office Action Issued in U.S. Appl. No. 14/717,788", dated Nov. 6, 2017, 18 Pages.

(56) References Cited

OTHER PUBLICATIONS

"Final Office Action Issued in U.S. Appl. No. 14/752,800", dated Nov. 8, 2017, 14 Pages.
"How Microsoft Designs its Cloud-Scale Servers", Retrieved From: http://download.microsoft.com/download/5/7/6/576F498A-2031-4F35-A156-BF8DB1ED3452/How_MS_designs_its_cloud_scale_servers_strategy_paper.pdf, Feb. 26, 2015,, 6 Pages.
"IBM PureData System for Analytics N2001", Retrieved From: http://public.dhe.ibm.com/common/ssi/ecm/wa/en/wad12353usen/WAD12353USEN.PDF, Feb. 26, 2015, 8 pages.
"International Preliminary Report on Patentability Issued in PCT Patent Application No. PCT/ US2016/026285", Oct. 26, 2017, 12 Pages.
"MicroBlaze Processor Reference Guide, Embedded Development Kit", Retrieved From: http://www.xilinx.com/support/documentation/sw_manuals/xilinx14_2/mb_ref_guide.pdf, 2012, 256 Pages.
"QP: A Heterogeneous Multi-Accelerator Cluster", In Proceedings of the 10th LCI International Conference on High-Performance Clustered Computing, Mar. 2009, 8 pages.
NIU, et al., "Reconfiguring Distributed Applications in FPGA Accelerated Cluster with Wireless Networking", IEEE 21st International Conference on Field Programmable Logic and Applications, 2011, 2011, 6 Pages.
"SRC MAPstation Systems", Retrieved From: http://www.srccomp.com/sites/default/files/pdf/SRC7_MAPstation_70000-AG.pdf, Feb. 26, 2015, 2 Pages.
"Stratix V Device Handbook", available at «http://www.altera.com/literature/hb/stratix-v/stx5_core.pdf and http://www.16 altera.com/literature/hb/stratix-v/stx5_xcvr.pdf», vols. 1 and 2, Altera Corporation, San Jose, CA, Sep. 30, 2014, 563 Pages.
"The Convey HC-2 Computer: Architectural Overview", Retrieved From: http://www.conveycomputer.com/index.php/download_file/view/143/142/, 2012, 10 pages.
"Non-Final Office Action Issued in U.S. Appl. No. 14/717,680", dated Jan. 11, 2017, 11 Pages.
"Non-Final Office Action Issued in U.S. Appl. No. 14/717,752", dated Nov. 7, 2016, 16 Pages.
"Final Office Action Issued in U.S. Appl. No. 14/717,752", dated Feb. 9, 2017, 14 Pages.
"Non Final Office Action Issued in U.S. Appl. No. 14/717,788", dated Jan. 31, 2018, 18 Pages.
"Non-Final Office Action Issued in U.S. Appl. No. 14/717,788", dated Jan. 25, 2017, 20 Pages.
"Non-Final Office Action Issued in U.S. Appl. No. 14/717,788", dated Aug. 22, 2017, 17 Pages.
"Final Office Action Issued in U.S. Appl. No. 14/717,721", dated Jun. 29, 2018, 51 Pages.
"Final Office Action Issued in U.S. Appl. No. 14/717,721", dated Apr. 5, 2017, 27 Pages.
"Non Final Office Action Issued in U.S. Appl. No. 14/717,721", dated Jan. 27, 2017, 25 Pages.
"Non Final Office Action Issued in U.S. Appl. No. 14/717,721", dated Jan. 24, 2018, 40 Pages.
"Non-Final Office Action Issued in U.S. Appl. No. 14/752,778", dated Feb. 2, 2017, 23 Pages.
Caulfield, "A Cloud-Scale Acceleration Architecture", In 49th Annual IEEE/ACM International Symposium on Microarchitecture, Oct. 15, 2015, 13 Pages.
"Non Final Office Action Issued in U.S. Appl. No. 14/752,800", dated May 3, 2018, 13 Pages.
"Non-Final Office Action Issued in U.S. Appl. No. 14/752,800", dated May 9, 2017, 12 Pages.
"Final Office Action Issued in U.S. Appl. No. 14/752,802", dated Jul. 7, 2017, 18 Pages.
"Non-Final Office Action Issued in U.S. Appl. No. 14/752,802", dated Feb. 10, 2017, 28 Pages.
"Non Final Office Action Issued in U.S. Appl. No. 14/752,807", dated Jun. 21, 2018, 13 Pages.
"Non Final Office Action Issued in U.S. Appl. No. 14/752,807", dated Sep. 22, 2017, 15 Pages.

"Office Action Issued in European Application No. 16719599.9", dated Aug. 9, 2018, 5 Pages.
"Office Action Issued in European Patent Application No. 16719604.7", dated Aug. 9, 2018, 7 Pages.
"Office Action Issued in European Patent Application No. 16719605.4", dated Aug. 9, 2018, 5 Pages.
Alachiotis,, et al., "Efficient PC-FPGA Communication Over Gigabit Ethernet", in Proceedings of the 10th IEEE International Conference on Computer and Information Technology, Jun. 2010, 8 Pages.
Alder et al., "Leap Scratchpads: Automatic Memory and Cache Management for Reconfigurable Logic", In Proceedings of the 19th ACM/SIGDA International Symposium on Field Programmable Gate Arrays, Feb. 2011, 4 Pages.
Baxter,, et al., "Maxwell—a 64 FPGA Supercomputer", In Proceedings of the Second NASA!ESA Conference on Adaptive Hardware and Systems, 8 Pages.
Bharthi, et al., "A Reconfigurable Framework for Cloud Computing Architecture", Journal of Artificial Intelligence, vol. 6, Issue 1, Jan. 14, 2013, 4 Pages.
Blott,, "Dataflow Architectures for 10Gbps Line-Rate Key-Value Stores", In Proceedings of the Symposium on High Performance Chips, Aug. 25, 2013, 25 Pages.
Bolchini, et al., "A Reliable Reconfiguration Controller for Fault-Tolerant Embedded Systems on Multi-FPGA 29 Platforms", In Proceedings of the IEEE 25th International Symposium on Defect and Fault Tolerance in VLSI Systems, D Oct. 6, 2010, Oct. 6, 2010, 9 Pages.
Burger, et al., "Providing Services in a System having a Hardware Acceleration Plane and a Software Plane", , 118 Pages.
Burger,, et al., "Data Processing System having a Hardware Acceleration Plane and a Software Plane", filed Apr. 17, 2015, 156 Pages.
Cervero, et al., "A resource manager for dynamically reconfigurable FPGA-based embedded systems", In Proceedings of the Euromicro Conference on Digital System Design, Sep. 2013, 8 Pages.
Chalamalasetti, et al., "Evaluating FPGA-Acceleration for Real-time Unstructured Search", In Proceedings of the IEEE International Symposium on Performance Analysis of Systems & Software, Apr. 2012, 10 Pages.
Chen, et al., "Enabling FPGAs in the Cloud", In Proceedings of the 11th ACM Conference on Computing Frontiers, Published on: May 20, 2014, 10 pages.
Chiou, et al., "Handling Tenant Requests in a System that Uses Acceleration Components", U.S. Appl. No. 14/717,752, filed May 20, 2015, 120 Pages.
Chung, et al., "CoRAM: An In-Fabric Memory Architecture for FPGA-based Computing", In Proceedings of the 19th ACM/SIGDA International Symposium on Field Programmable Gate Arrays, Feb. 2011, 10 pages.
Eguro, et al., "FPGAS for Trusted Cloud Computing", In Proceedings of the International Conference on Field-Programmable Logic and Applications, Aug. 2012, 8 Pages.
Eshelman,, DJ,, "Think You Don't Need GPUs in the Datacenter? Think Again", Retrieved From: http://www.gtri.com/think-you-dont-need-gpus-in-the-datacenter-think-again/, Jul. 23, 2014, 9 Pages.
Estlick., et al., "Algorithmic Transformations in the Implementation of K-Means Clustering on Reconfigurable Hardware", In Proceedings of the ACM/SIGDA Ninth International Symposium on Field Programmable Gate Arrays, February 2001,, 8 Pages.
Fahmy,, "A Case for FPGA Accelerators in the Cloud", Poster in of ACM Symposium on Cloud Computing, Nov. 2014, 1 Pages.
George,, et al., "Novo-G: AI the Forefront of Scalable Reconfigurable Supercomputing", in Journal of Computing in Science & Engineering, vol. 13, Issue 1,, Jan. 2011,, 5 Pages.
Hammad, et al., "Highly Expandable Reconfigurable Platform using Multi-FPGA based Boards", In International Journal of Computer Applications, vol. 51 No. 12, Aug. 2012, 6 Pages.
Hussain,, et al., "Highly Parameterized K-means Clustering on FPGAs: Comparative Results with GPPs and GPUs", In Proceedings of the International Conference on Reconfigurable Computing and FPGAs, Nov. 2011, 6 Pages.

(56) References Cited

OTHER PUBLICATIONS

Inoue,, et al., "20Gbps C-Based Complex Event Processing", In Proceedings of the 2011 21st International Conference on Field Programmable Logic and Applications, 2011, 6 Pages.
Inta, et al., "The 'Chimera': An Off-The-Shelf CPU/GPGPU/FPGA Hybrid Computing Platform", In International Journal of Reconfigurable Computing, vol. 2012, Article ID 241439, Jan. 2012, 10 Pages.
Jamuna, et al., "Fault Tolerant Tecniques for Reconfigurable Devices: a brief Survey", In International Journal Application or Innovation in Engineering & Management, vol. 2, Issue 1,, Jan. 2013, 6 Pages.
Jun,, et al., "Scalable Multi-Access Flash Store for Big Data Analytics", in Proceedings of 22nd ACM/SIGDA International Symposium on Field-Programmable Gate Arrays, Feb. 26, 2014, 10 Pages.
Kachris, et al., "A Configurable MapReduce Accelerator for Multicore FPGAs", In Proceedings of the 2014 ACM/SIGDA international symposium on Field-programmable gate arrays, Feb. 26-28, 2014, 1 Page.
Kachris,, et al., "A Reconfigurable MapReduce Accelerator for Multi-Core All-Programmable SoCs", in Proceedings of the International Symposium on System-on-Chip, Oct. 28, 2014, 6 Pages.
Khalilzad,, et al., et al., "FPGA implementation of Real-time Ethernet communication using RMII Interface", In Proceedings of the IEEE 3rd International Conference on Communication Software and Networks, May 2011, 7 Pages.
Kim, "Polymorphic On-Chip Networks", In 35th International Symposium on Computer Architecture, Jun. 21, 2008, pp. 101-112.
Kirchgessner,, et al., "VirtuaiRC: A Virtual FPGA Platform for Applications and Tools Portability", In Proceedings of the ACM/SIGDA International Symposium on Field Programmable Gate Arrays, Feb. 2012,, 4 Pages.
Krieg, et al., "Run-Time FPGA Health Monitoring using Power Emulation Techniques", In Proceedings of the IEEE 54th International Midwest Symposium on Circuits and Systems, Aug. 7, 2011, 4 Pages.
Lavasani,, et al., "An FPGA-based In-line Accelerator for Memcached", in IEEE Computer Architecture Letters, vol. 13, No. 2, Jul. 15, 2013, 4 Pages.
Machidon, et al., "Cloud Perspective on Reconfigurable Hardware", In Review of the Air Force Academy, 6 Pages.
Macvitiie,, et al., "Hardware Acceleration Critical Component for Cost-Conscious Data Centers", Retrieved From: https://devcentral.f5.com/articles/hardware-acceleration-critical-component-for-cost-conscious-data-centers, Mar. 24, 2009, 10 Pages.
Madhavapeddy, et al., "Reconfigurable Data Processing for Clouds", In Proceedings IEEE International Symposium on Field-Programmable Custom Computing Machines, May 1, 2011, 5 Pages.
Mamiit,, Aaron,, "Intel develops hybrid Xeon-FPGA chip for cloud services", Retrieved From:https://www.techtimes.com/articles/8794/20140620/intel-develops-hybrid-xeon-fpga-chip-for-cloud-services.htm, Jun. 20, 2014, 4 Pages.
Markettos,, et al., "Interconnect for commodity FPGA clusters: standardized or customized?", In Proceedings of the 24th International Conference on Field Programmable Logic and Applications, Sep. 2, 2014, 8 Pages.
Martin,, et al., "FPGA-Based Application Acceleration: Case Study with GZIP Compression/Decompression Streaming Engine", In ICCAD Special Session 7C, Nov. 2013, 1 Page.
McLoughlin, et al., "Achieving Low-cost High-reliability Computation Through Redundant Parallel Processing", In Proceedings of International Conference on Computing & Informatics, Jun. 6, 2006, 6 Pages.
Mershad, et al., "A Framework for Multi-cloud Cooperation with Hardware Reconfiguration Support", In the Proceedings of IEEE Ninth World Congress on Services, Jun. 28, 2013, pp. 52-59.
Mesquita, et al., "Remote and Partial Reconfiguration of FPGAs: tools and trends", In Proceedings of the International Parallel and Distributed Processing Symposium, Apr. 22, 2003, 8 Pages.
Moorhead,, Patrick,, "Moving Beyond CPUs in the Cloud: Will FPGAs Sink or Swim?", Retrieved From: http://www.moorinsightsstrategy.com/wp-content/uploads/2014/12/Moving-Beyond-CPUs-in-the-Cloud-Will-FPGAs-Sink-or-Swim-by-Moor-Insights-and-Strategy.pdf Dec. 2, 2014, 5 Pages.
Morris,, Kevin,, "FPGAs Cool Off the Datacenter", Retrieved From https://www.eejournal.com/article/20141118-datacenter/, Nov. 18, 2014, 5 Pages.
Mysore, et al., "Portland: A Scalable Fault-Tolerant Layer 2 Data Center Network Fabric", In ACM SIGCOMM Computer Communication Review, vol. 39, No. 4,, Aug. 16, 2009, 12 Pages.
Oden, et al., "GGAS: Global GPU Address Spaces for Efficient Communication in Heterogeneous Clusters", In Proceedings of the IEEE International Conference on Cluster Computing, Sep. 23, 2013, 8 Pages.
Papadimitriou, et al., "Performance of Partial Reconfiguration in FPGA Systems; A Survey and a Cost Model", In ACM Transactions on Reconfigurable Technology and Systems, vol. 4, No. 4, Dec. 1, 2011, 24 Pages.
PCT/ US2016/038841, "International Search Report and Written Opinion in PCT Application No. PCT/US2016/038841", dated Sep. 28, 2016, 18 Pages.
"International Search Report & Written Opinion Issued in PCT Application No. PCT/US2016/026284", dated Jun. 20, 2016, 13 Pages.
"International Search Report & Written Opinion Issued in PCT Application No. PCT/US2016/026285", dated Jun. 23, 2016, 16 Pages.
"International Preliminary Report on Patentability Issued in PCT Application No. PCT/US2016/026286", dated May 24, 2017, 11 Pages.
"International Search Report and Written Opinion Issued in PCT Application No. PCT/US2016/026286", dated Jul. 4, 2016,, 15 Pages.
"Second Written Opinion Issued in PCT Application No. PCT/US2016/026286", dated Oct. 14, 2016, 9 Pages.
"International Search Report and Written Opinion Issued in PCT Application No. PCT/US2016/026287", dated Jul. 4, 2016, 16 Pages.
"International Preliminary Report on Patentability Issued in PCT Application No. PCT/US2016/026290", dated Mar. 13, 2017, 8 Pages.
"International Search Report & Written Opinion Received for PCT Application No. PCT/US2016/026291", dated Jun. 20, 2016, 11 Pages.
"International Preliminary Report on Patentability Issued in PCT Application No. PCT/US2016/026293", dated Mar. 13, 2017, 8 Pages.
"International Search Report & Written Opinion Received for PCT Application No. PCT/US2016/026293", dated Jun. 20, 2016, 10 Pages.
"International Search Report and Written Opinion Issued in PCT Application No. PCT/US2016/038838", dated Sep. 5, 2016, 12 Pages.
Pell, et al., "Surviving the end of frequency scaling with reconfigurable dalaftow computing", In ACM SIGARCH Computer Architecture News, vol. 39, Issue 4, Sep. 2011, 6 Pages.
"Final Office Action Issued in U.S. Appl. No. 14/752,807", dated Oct. 18, 2018, 7 Pages.

* cited by examiner

PARTIALLY RECONFIGURING ACCELERATION COMPONENTS

CROSS-REFERENCE TO RELATED APPLICATIONS

Not applicable

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems.

BRIEF SUMMARY

Examples extend to methods, systems, and computer program products for partially reconfiguring acceleration components. A reason for changing the provided functionality of an acceleration component is detected (e.g., an error at the acceleration component or an available update to the provided functionality). The provided functionality at the acceleration component is halted. The acceleration component is partially reconfigured by writing an image for the provided functionality to the acceleration component (e.g., to address an error or update the provided functionality). Other functionality at the acceleration component is maintained as operational during partially reconfiguring the acceleration component. The provided functionality is activated at the acceleration component after partially reconfiguring the acceleration component is complete.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1:
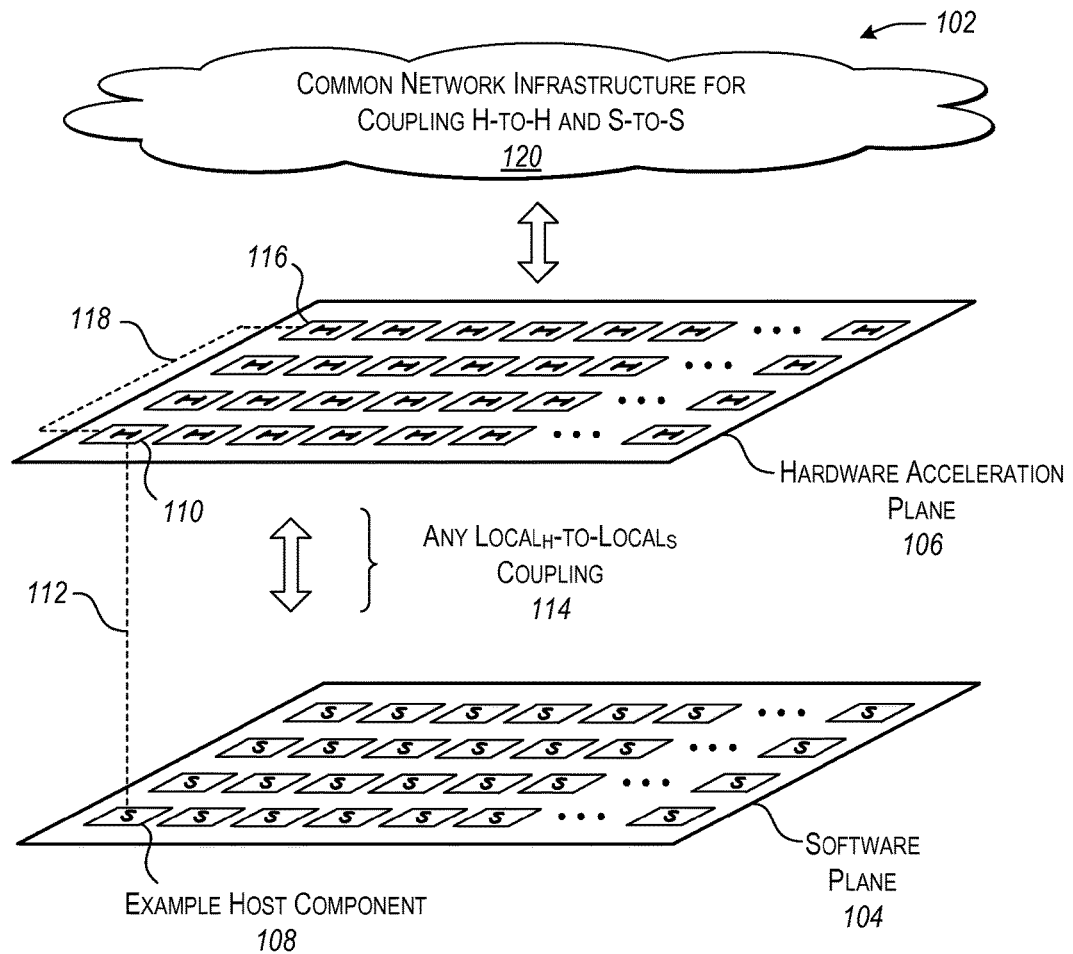
FIG. 1 illustrates an example architecture that includes a software plane and a hardware acceleration plane.

Examples extend to methods, systems, and computer program products for partially reconfiguring acceleration components. A reason for changing the provided functionality of an acceleration component is detected (e.g., an error at the acceleration component or an available update to the provided functionality). The provided functionality at the acceleration component is halted. The acceleration component is partially reconfigured by writing an image for the provided functionality to the acceleration component (e.g., to address an error or update the provided functionality). Other functionality at the acceleration component is maintained as operational during partially reconfiguring the acceleration component. The provided functionality is activated at the acceleration component after partially reconfiguring the acceleration component is complete.

In one aspect, an acceleration component (e.g., a hardware accelerator, such as, a Field Programmable Gate Array (FPGA)) provides functionality to a group of interoperating acceleration components that provide acceleration for a service. Functionality at each acceleration component in the group of interoperating acceleration components is composed together in a graph to provide the service acceleration. The acceleration component has other functionality in addition to the provided functionality. The group of interoperating acceleration components and one or more other acceleration components are part of a hardware acceleration plane that includes a larger plurality of acceleration components providing a configurable fabric of acceleration components for accelerating services.

Implementations may comprise or utilize a special purpose or general-purpose computer including computer hardware, such as, for example, one or more processors and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multi-processor systems, microprocessor-based or programmable consumer electronics, network PCs, minicomputers, mainframe computers, mobile telephones, PDAs, tablets, pagers, watches, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In this description and the following claims, an "acceleration component" is defined as a hardware component specialized (e.g., configured, possibly through programming) to perform a computing function more efficiently than software running on general-purpose central processing unit (CPU) could perform the computing function. Acceleration components include Field Programmable Gate Arrays (FPGAs), Graphics Processing Units (GPUs), Application Specific Integrated Circuits (ASICs), Erasable and/or Complex programmable logic devices (PLDs), Programmable Array Logic (PAL) devices, Generic Array Logic (GAL) devices, and massively parallel processor array (MPPA) devices.

In this description and in the following claims, a "role" is defined as functionality provided by an acceleration component to a group of interoperating acceleration components used to accelerate a service. Roles at each acceleration component in a group of interoperating acceleration components can be linked together to compose a graph that provides the service acceleration.

In this description and in the following claims, a "graph" is defined as a group of interconnected (e.g., network connected) acceleration components providing acceleration for a service wherein each acceleration component in the group provides a portion of the acceleration functionality.

In this description an in the following claims, an "image" is defined as a file including information that can be used in configuration of an acceleration component, such as, for example, an FPGA. Information included in an image file can be used to program hardware components of an acceleration component (e.g., logic blocks and reconfigurable interconnects of an FPGA) to implement desired functionality. Desired functionality can be implemented to solve virtually any problem which is computable.

In this description and in the following claims, a "neighbor acceleration component" is defined as an acceleration component configured to exchange input and/or output with another acceleration component when interconnected to the other acceleration component within a graph. Neighbor is viewed logically from the perspective of the graph. The physical proximity of an acceleration component relative to another acceleration component is not a determining factor in identifying neighbor acceleration components. That is, acceleration components that are not physically adjacent to one another (or even near to one another on a network or within a datacenter) can be configured to exchange data with one another when interconnected within a graph. Acceleration components interconnected within a graph can be viewed as neighbor acceleration components even if data exchanged between the acceleration components physically passes through other acceleration components outside of the graph or through host components in transit between the acceleration components. However, acceleration components that are physically adjacent or near to one another on a network or in a datacenter and are interconnected within a graph can also be viewed as neighbor acceleration components with respect to one another.

In general, an acceleration component can include an array of programmable logic blocks and hierarchy of reconfigurable interconnects that allow logic blocks to be connected together in different configurations to provide different functionality (i.e., different roles). Image files can be received and loaded at an acceleration component to configure programmable logic blocks and configure interconnects to provide desired functionality (i.e., roles).

In some environments, applications (services) are provided to a client from a data center. A data center includes multiple (and potentially a very large number of) software-driven general purpose computing devices. Each general purpose computing device can include one or more central processing units (CPUs) that process machine-readable instructions to perform specified computing activities. The multiple general purpose computing devices are networked to one another such that the combined power of the multiple general purpose computer systems (or subsets thereof) can be used to perform more complex computing activities.

Data center providers face continuing challenges to increase processing capabilities and efficiency within and provided by data centers. Continuing to add more and more general purpose computing devices is not feasible due at least in part to power limitations. Computing device specialization is one option. For example, computing devices can be specialized for specific scale workloads to provide some efficiency gains. However, computing device specialization is problematic for at least two reasons. First, lack of homogeneity in a data center increases management issues and provides inconsistent platforms for applications to rely on. Further, data center services evolve rapidly, making non-programmable hardware features impractical. Thus, data center providers need continued improvements in performance and efficiency but cannot obtain those improvements from general purpose computing devices.

Aspects facilitate partially reconfiguring an acceleration component. Partial reconfiguration can be implemented for any of a variety of reasons, including to address an error in functionality at the acceleration component or to update functionality at the acceleration component. During partial reconfiguration, connectivity can be maintained for any other functionality at the acceleration component untouched by the partial reconfiguration. Partial reconfiguration is more efficient to deploy than full reconfiguration of an acceleration component.

In some aspects, an acceleration component provides a role to a group of interoperating acceleration components that provide acceleration of a service. Roles at each acceleration component in the group of interoperating acceleration components are composed together into a graph that provides the service acceleration. The acceleration component can also have other functionality in addition to the role.

For example, in one aspect, an acceleration component provides roles to a plurality of groups of interoperating acceleration components composed together into graphs to provide acceleration for a plurality of corresponding services. During reconfiguration of a role for one group of interoperating acceleration components, roles for any other groups of interoperating acceleration components can be maintained. Various groups of interoperating acceleration components can be part of a hardware acceleration plane that includes a larger plurality of acceleration components. The hardware acceleration plane provides a configurable fabric of acceleration components for accelerating services.

An acceleration component can be programmed to include a network interface. The network interface permits the acceleration component to exchange network traffic with other components, such as, for example, other acceleration components or host components. As such, when one role at an acceleration component is being reconfigured, any other roles at the acceleration component can be maintained as stable and operational. Further, when a role at an acceleration component is being reconfigured, the network interface can be maintained as stable and operational. Thus, during reconfiguration of one role at acceleration component, any of the other roles at the acceleration component can continue to use the network interface to route network traffic between the acceleration component and other components.

Any number of different components might detect a reason for changing the provided functionality at an acceleration component. In one aspect, a higher level service monitors a hardware acceleration plane for roles exhibiting incorrect behavior or roles for which an update is available. When an incorrect behavior is detected or an update is available, the higher level service can initiate reconfiguration of a role at an acceleration component to address the error or update the role. In another aspect, a local monitor at an acceleration component monitors the acceleration component for roles exhibiting incorrect behavior or roles for which an update is available. When an incorrect behavior is detected or an update is available, the local monitor can initiate reconfiguration of a role at the acceleration component to address the error or update the role.

In a further aspect, acceleration components are locally linked to host components (e.g., CPUs). In these further aspects, a locally linked host component monitors an acceleration component for roles exhibiting incorrect behavior or roles for which an update is available. When an incorrect behavior is detected or an update is available, the host component can initiate reconfiguration of a role at the acceleration component to address the error or update the role.

In general, a data center deployment includes a hardware acceleration plane and a software plane. The hardware acceleration plane can include a plurality of networked acceleration components (e.g., FPGAs). The software plane can include a plurality of networked software-implemented host components (e.g., central processing units (CPUs)). A network infrastructure can be shared between the hardware acceleration plane and the software plane. In some environments, software-implemented host components are locally linked to corresponding acceleration components.

FIG. 1 illustrates an example architecture 102 that includes a software plane 104 and a hardware acceleration plane 106. The software plane 104 includes a collection of software-driven components (each denoted by the symbol "S") while the hardware plane includes a collection of hardware acceleration components (each denoted by the symbol "H"). For example, each host component may correspond to a server computer that executes machine-readable instructions using one or more central processing units (CPUs). Each CPU, in turn, may execute the instructions on one or more hardware threads. Each acceleration component can execute hardware logic for implementing functions, such as, for example, portions of services offer by a data center.

Hardware acceleration plane 106 can be constructed using a heterogeneous collection of acceleration components, including different types of acceleration components and/or the same type of acceleration components with different capabilities. For example, hardware acceleration plane 106 can include FPGA devices having different respective processing capabilities and architectures, a mixture of FPGA devices and other devices, and so on. Hardware acceleration plane 106 provides a reconfigurable fabric of acceleration components.

A host component generally performs operations using a temporal execution paradigm (i.e., sequentially) by using each of its CPU hardware threads to execute machine-readable instructions, one after the after. In contrast, an acceleration component may perform operations using a spatial paradigm (i.e., concurrently) by using a large number of parallel logic elements to perform computational tasks. Thus, an acceleration component can perform some operations in less time compared to a software-driven host component. In the context of the architecture 102, the "acceleration" qualifier associated with the term "acceleration component" reflects its potential for accelerating the functions that are performed by the host components.

In one example, architecture 102 corresponds to a data center environment that includes a plurality of computer servers. The computer servers correspond to the host components in the software plane 104. In another example, architecture 102 corresponds to an enterprise system. In a further example, the architecture 102 corresponds to a user device or appliance which uses at least one host component that has access to two or more acceleration components, etc. Other implementations for architecture 102 are also possible.

Common network infrastructure 120 couples host components in the software plane 104 to other host components and couples acceleration components in the hardware acceleration plane 106 to other acceleration components. That is, host components can use common network infrastructure 120 to interact with one another and acceleration components can use common network infrastructure 120 to interact with one another. Interaction among host components in the software plane 104 is independent of the interaction among acceleration components in the hardware acceleration plane 106. As such, two or more acceleration components may communicate in a transparent manner relative to host components in the software plane 104, outside the direction of the host components, and without the host components being "aware" of particular interaction is even taking place in the hardware acceleration plane 106.

Architecture 102 can use any of a variety of different protocols to facilitate communication between acceleration components over network infrastructure 120 and can use any of a variety of different protocols to facilitate communication between host components over network infrastructure 120. For example, architecture 102 can uses Ethernet protocol to transmit Internet Protocol (IP) packets over network infrastructure 120. In one implementation, each local host component in a server is given a single physical IP address. The local acceleration component in the same server may adopt the same IP address. The server can determine whether an incoming packet is destined for the local host component or destined for the local acceleration component in different ways. For example, packets that are destined for the local acceleration component can be formulated as UDP packets having a specific port; host-defined packets, on the other hand, may not be formulated in this way. In another example, packets belonging to the acceleration plane 106 can be distinguished from packets belonging to the software plane 104 based on the value of a status flag in each of the packets.

As such, architecture 102 can be viewed as two logical networks (software plane 104 and hardware acceleration plane 106) that share the same physical network communication links. Packets associated with the two logical networks may be distinguished from each other by their respective traffic classes.

In another aspect, each host component in the architecture 102 is coupled to at least one acceleration component in hardware acceleration plane 104 through a local link. For example, a host component and acceleration component can be arranged together and maintained as single serviceable unit (e.g., a server) within architecture 102. In this arrangement, the server can be referred to as the "local" host component to distinguish it from other host components that are associated with other servers. Similarly, acceleration component(s) of a server can be referred to as the "local" acceleration component(s) to distinguish them from other acceleration components that are associated with other servers.

As depicted in architecture 102, host component 108 is coupled to acceleration component 110 through a local link 112 (e.g., a Peripheral Component Interconnect Express (PCIe) link). Thus, host component 108 is a local host component form the perspective of acceleration component 110 and acceleration component 110 is a local acceleration component from the perspective of host component 108. The local linking of host component 108 and acceleration component 110 can form part of a server. More generally, host components in software plane 104 can be locally coupled to acceleration components in hardware acceleration plane 106 through many individual links collectively represented as a local$_H$-to-local$_S$ coupling 114.

Thus, a host component can interact directly with any locally linked acceleration components. As such, a host component can initiate communication to a locally linked acceleration component to cause further communication among multiple acceleration components. For example, a host component can issue a request for a service (or portion thereof) where functionality for the service (or portion thereof) is composed across a group of one or more acceleration components in hardware acceleration plane 106.

Thus, a host component can also interact indirectly with other acceleration components in hardware acceleration plane 106 to which the host component is not locally linked. For example, host component 108 can indirectly communicate with acceleration component 116 via acceleration component 110. More specifically, acceleration component 110 communicates with acceleration component 116 via a link 118 (e.g., network infrastructure 120).

Acceleration components in hardware acceleration plane 106 can be used to accelerate larger-scale services robustly in a data center. Substantial portions of complex datacenter services can be mapped to acceleration components (e.g., FPGAs) by using low latency interconnects for computations spanning multiple acceleration components. Acceleration components can also be reconfigured as appropriate to provide different service functionality at different times.

Figure 2:
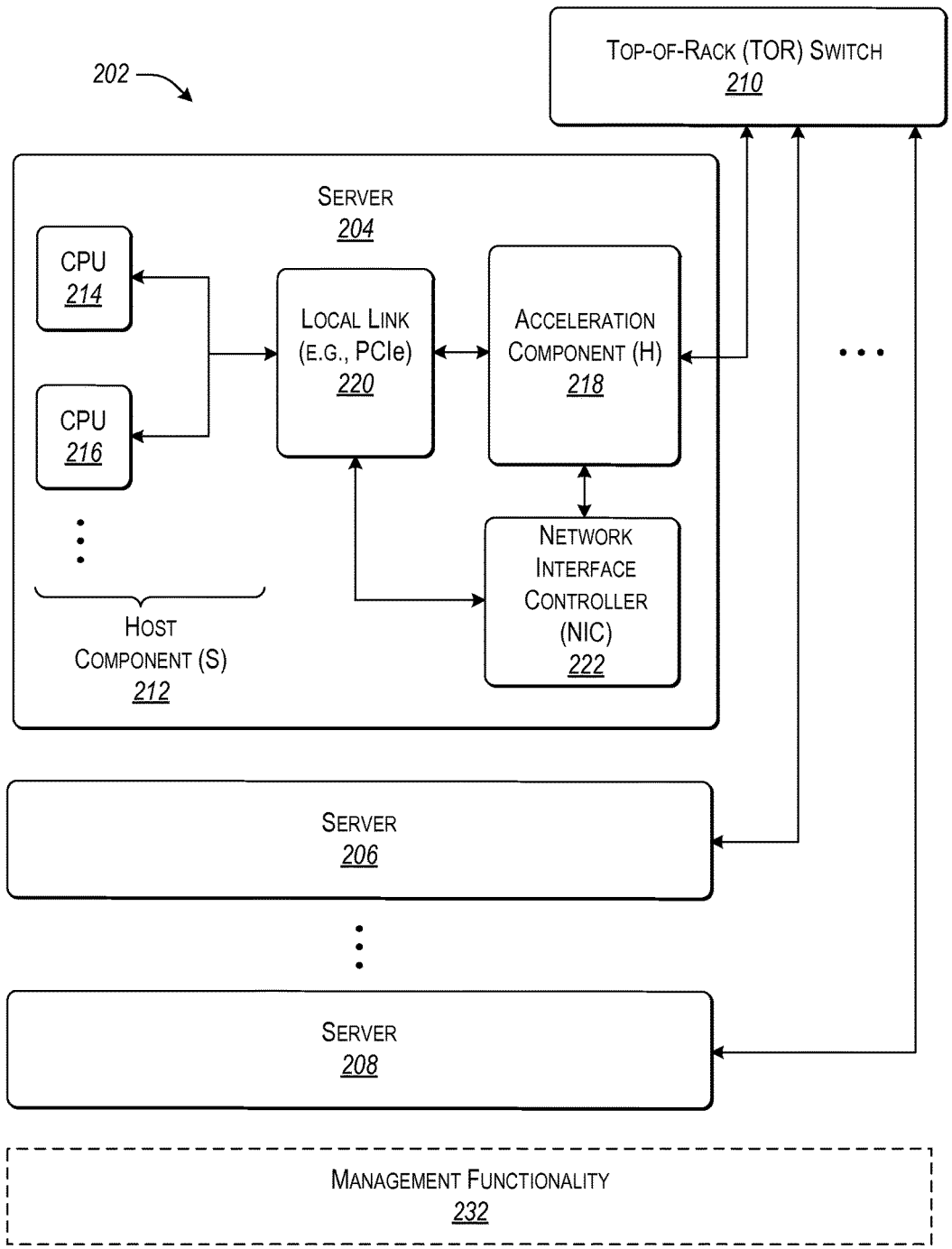
FIG. 2 illustrates an example architecture, including servers, that can be used in a data center

FIG. 2 illustrates an example architecture 202 that can be used in a data center. Servers 204, 206, and 208 can be included in a rack in the data center. Each of servers 204, 206, and 208 can be coupled to top-of-rack (TOR) switch 210. Other racks, although not shown, may have a similar configuration. Server 204 further includes host component 212 including CPUs 214, 216, etc. Host component 212 along with host components from servers 206 and 208 can be included in software plane 104. Server 204 also includes acceleration component 218. Acceleration component 218 along with acceleration components from servers 206 and 208 can be included in hardware acceleration plane 106.

Acceleration component 218 is directly coupled to host component 212 via local link 220 (e.g., a PCIe link). Thus, host component 212 can view acceleration component 218 as a local acceleration component and acceleration component 218 can view host component 212 as a local host component. Acceleration component 218 and host component 212 are also indirectly coupled by way of network interface controller 222 (e.g., used to communicate across network infrastructure 120). Server 204 can load images representing service functionality onto acceleration component 218.

Acceleration component 218 is also coupled to TOR switch 210. Hence, in architecture 202, acceleration component 218 represents the path through which host component 212 interacts with other components in the data center (including other host components and other acceleration components). Architecture 202 allows acceleration component 218 to perform processing on packets that are received from (and/or sent to) TOR switch 210 (e.g., by performing encryption, compression, etc.), without burdening the CPU-based operations performed by host component 212.

Management functionality 232 serves to manage the operations of architecture 202. Management functionality 232 can be physically implemented using different control architectures. For example, in one control architecture, the management functionality 232 may include plural local management components that are coupled to one or more global management components.

Figure 3:
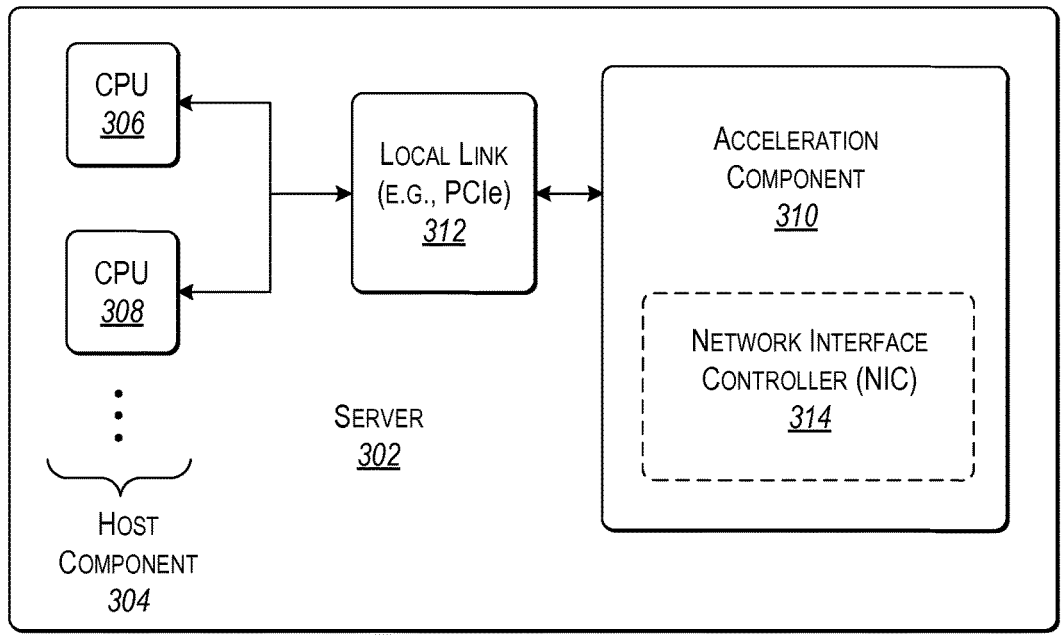
FIG. 3 illustrates an example server.

FIG. 3 illustrates an example server 302. Server 302 includes host component 304 including CPUs 306, 308, etc., acceleration component 310, and local link 312. Acceleration component 310 is directly coupled to host component 304 via local link 312 (e.g., a PCIe link). Thus, host component 304 can view acceleration component 310 as a local acceleration component and acceleration component 310 can view host component 304 as a local host component. Host component 304 and acceleration component 310 can be included in software plane 104 and hardware acceleration plane 106 respectively. Server 302 implements network interface controller (NIC) 314 as an internal component of acceleration component 310. Server 302 can load images representing service functionality onto acceleration component 310.

Figure 4:
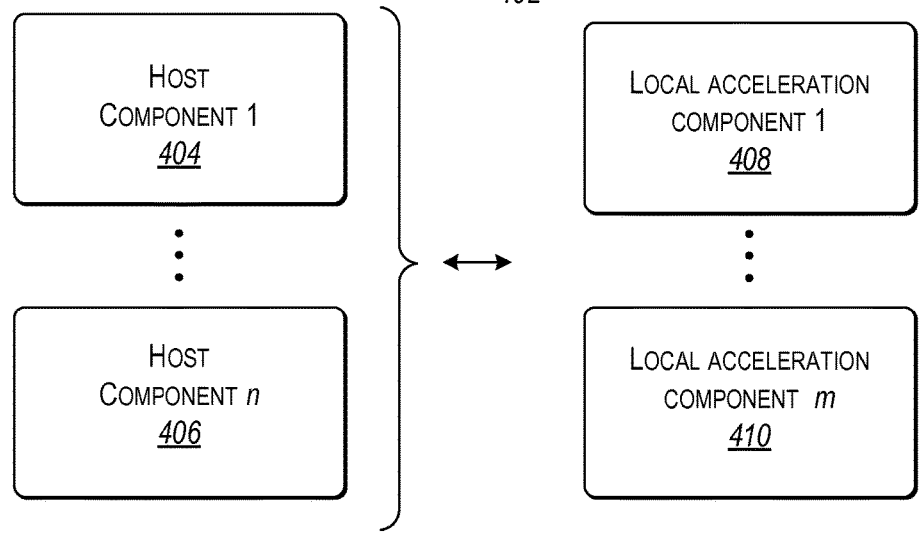
FIG. 4 illustrates an example server.

FIG. 4 illustrates an example server 402. Server 402 includes host components 404 through 406 including any number n of host components. Host components 404 through 406 can be included in software plane 104. Server 402 includes acceleration components 408 through 410 including any number m of acceleration components. Acceleration components 408 through 410 can be included in hardware acceleration plane 106. Server 402 can also include a network interface controller (not shown).

Server 402 can include a single host component locally linked to two acceleration components. The two acceleration components can perform different respective tasks. For example, one acceleration component can be used to process outgoing traffic to its local TOR switch, while the other acceleration component can be used to process incoming traffic from the TOR switch. In addition, server 402 can load images representing service functionality onto any of the acceleration components 408 through 410.

In general, a service (e.g., document ranking, encryption, compression, computer vision, speech translation, machine learning, etc.) can be implemented at one or more host components, at one or more acceleration components, or a combination of one or more host components and one or more acceleration components depending on what components are better suited to provide different portions of the service.

Figure 5:
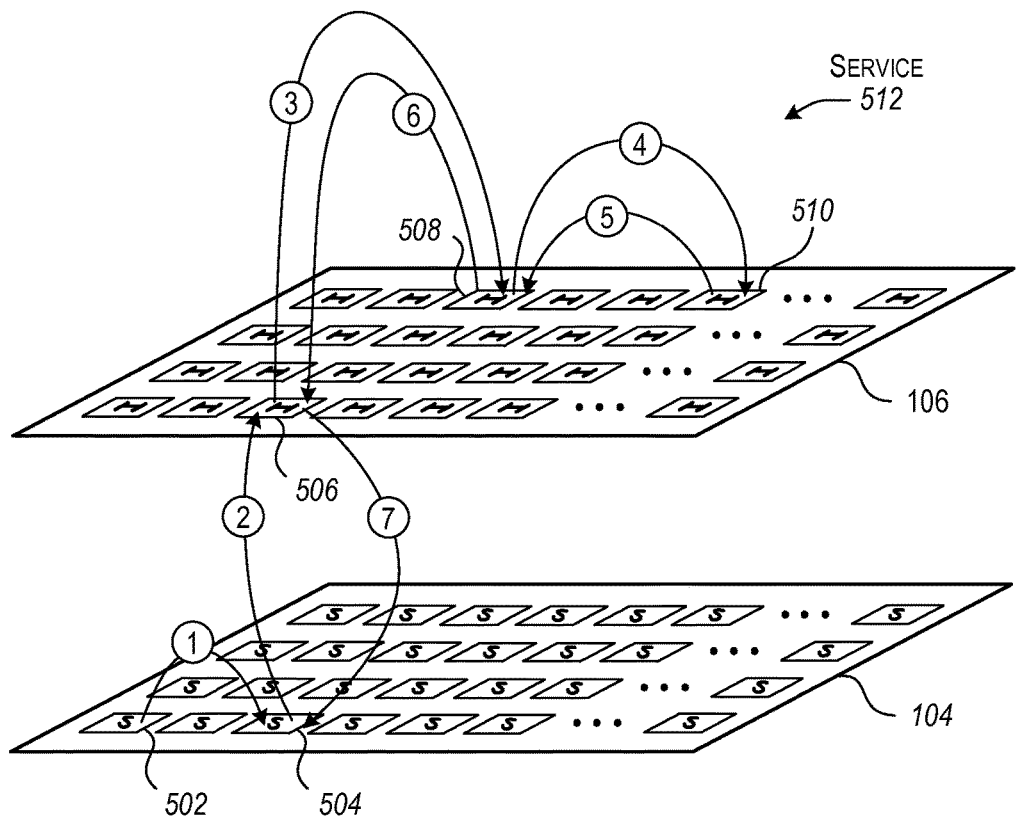
FIG. 5 illustrates an example service implemented using components of a software plane and components of a hardware acceleration plane.

FIG. 5 illustrates an example service 512 implemented using components of software plane 104 and components of hardware acceleration plane 106. In operation (1), host component 502 communicates with host component 504 in the course of performing a computational task. In operation (2) host component 504 then requests the use of service 512 that is implemented in the hardware acceleration plane 106 (although host component 504 may not be "aware" of where service 512 is implemented) by communicating with acceleration component 506 over a local link.

The requested service 512 is a composed service spread out over a plurality of acceleration components, each of which performs a specified portion of the service. Although acceleration component 506 was contacted to request use of the service 512, acceleration component 506 may not be the head of the composed service (or even be part of the multi-component service). Instead, acceleration component 508 may be the head component for the composed service.

As such, in operation (3), host component 504 indirectly communicates with acceleration component 508 via acceleration component 506. Acceleration component 508 then performs its portion of the composed service to generate an intermediate output result. In operation (4), acceleration component 508 then invokes acceleration component 510, which performs another respective portion of the composed service, to generate a final result. In operations (5), (6), and (7), the hardware acceleration plane 106 successively forwards the final result back to the requesting host component 504, through the same chain of components set forth above but in the opposite direction.

Operations in hardware acceleration plane 106 are performed in an independent manner of operations performed in the software plane 104. In other words, the host components in the software plane 104 do not manage the operations in the hardware acceleration plane 106. However, the host components may invoke the operations in the hardware acceleration plane 106 by issuing requests for services that are hosted by the hardware acceleration plane 106.

The hardware acceleration plane 106 operates in a manner that is transparent to a requesting host component. For example, host component 504 may be "unaware" of how its request is being processed in hardware acceleration plane 106, including the fact that the service corresponds to a composed service.

Communication in software plane 104 (e.g., corresponding to operation (1)) can take place using the same common network infrastructure 120 as communication in the hardware acceleration plane 106 (e.g., correspond to operations (3)-(6)). Operations (2) and (7) may take place over a local link, corresponding to the $local_H$-to-$local_S$ coupling 114 shown in FIG. 1.

Figure 6:
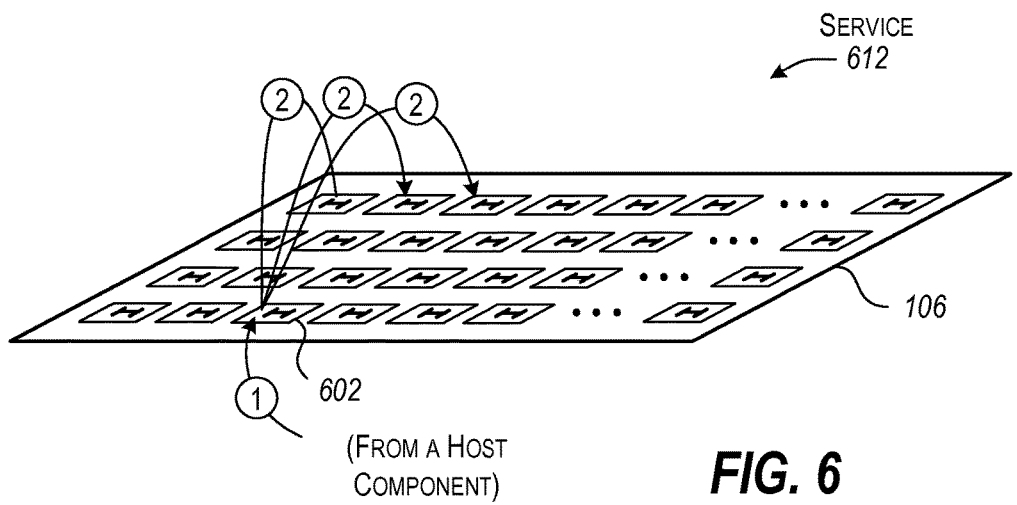
FIG. 6 illustrates an example service implemented using components of a software plane and components of a hardware acceleration plane.

FIG. 6 illustrates an example service 612 implemented using components of a software plane and components of hardware acceleration plane 106 Service 612 uses a different flow structure than service 512. More specifically, in operation (1), a host component (not shown) sends a request to its local acceleration component 602. In this example, local acceleration component 602 is also the head component of service 612. In operation (2), local acceleration component 602 may then forward one or more messages to a plurality of respective acceleration components. Each acceleration component that receives a message may perform a portion of a composed service in parallel with the other acceleration components. (FIG. 6 may represent only a portion of service 612, other portions of service 612 can be implemented at other hardware accelerators).

In general, an acceleration component can include any of variety of components some of which can be more or less common across different application images. Some components, such as, for example, a role, are distinct between application images. Other components, such as, for example, routers, transport components, switches, diagnostic recorders, etc., can be relatively common between some number of application images. These other relatively common components can be viewed as being included in an intermediate layer of abstraction or "soft shell". Further components, such as, for example, bridges, bypass controls, Network Interface Cards, Top of Rack Interfaces, buffers, memory controllers, PCIe controllers, Inter-FPGA network controllers, configuration memories and interfaces, host interfaces, debugging and back-channel interfaces (e.g., Joint Test Action Group (JTAG) interfaces, Inter-Integrated Circuit (I2C) interfaces, etc.), sensors, etc. can be very common between a higher number of (and essentially all) application images. These further very common components can be viewed as included in a greater layer of abstraction (e.g., than the other relatively common components) or "shell".

When an acceleration component (e.g., an FPGA) is reconfigured with new functionality, it is likely (although not guaranteed) that a role (i.e., the application-specific logic) at the acceleration component is changed. However, it is unlikely that existing functionality in the soft shell is changed and it is extremely unlikely that existing functionality in the shell is changed. Thus, components in the soft shell and to greater extent components in the shell provide a common interface for a role. As such, the shell allows code for a role to be ported relatively easy across different acceleration components.

Figure 7:
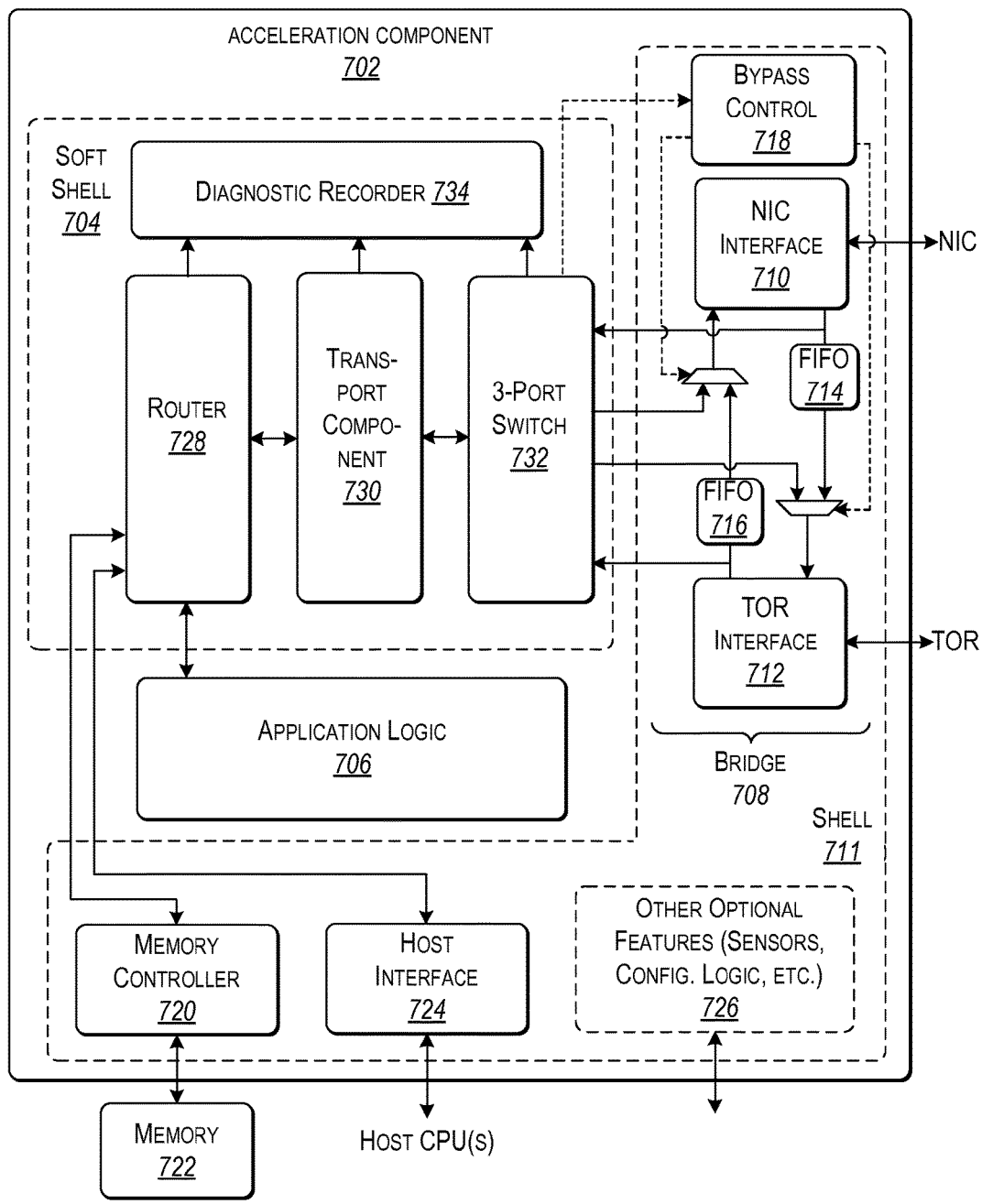
FIG. 7 illustrates an example architecture of an acceleration component.

Turning to FIG. 7, FIG. 7 illustrates an example architecture of an acceleration component 702. Acceleration component 702 can be included in hardware acceleration plane 106. Components included in acceleration component 702 can be implemented on hardware resources (e.g., logic blocks and programmable interconnects) of acceleration component 702.

Acceleration component 702 includes application logic 706, soft shell 704 associated with a first set of resources and shell 711 associated with a second set of resources. The resources associated with shell 711 correspond to lower-level interface-related components that generally remain the same across many different application scenarios. The resources associated with soft shell 704 can remain the same across at least some different application scenarios. The application logic 706 may be further conceptualized as including an application domain (e.g., a "role"). The application domain or role can represent a portion of functionality included in a composed service spread out over a plurality of acceleration components.

The application domain hosts application logic 706 that performs service specific tasks (such as a portion of functionality for ranking documents, encrypting data, compressing data, facilitating computer vision, facilitating speech translation, etc.). Resources associated with soft shell 704 are generally less subject to change compared to the application resources, and the resources associated with shell 711 are less subject to change compared to the resources associated with soft shell 704 (although it is possible to change (reconfigure) any component of acceleration component 702).

In operation, application logic 706 interacts with the shell resources and soft shell resources in a manner analogous to the way a software-implemented application interacts with its underlying operating system resources. From an application development standpoint, the use of common shell resources and soft shell resources frees a developer from having to recreate these common components for each service.

Referring first to the shell 711, shell resources include bridge 708 for coupling acceleration component 702 to the network interface controller (via a NIC interface 710) and a local top-of-rack switch (via a TOR interface 712). Bridge 708 also includes a data path that allows traffic from the NIC or TOR to flow into acceleration component 702, and traffic from the acceleration component 702 to flow out to the NIC or TOR. Internally, bridge 708 may be composed of various FIFOs (714, 716) which buffer received packets, and various selectors and arbitration logic which route packets to their desired destinations. A bypass control component 718, when activated, can control bridge 708 so that packets are transmitted between the NIC and TOR without further processing by the acceleration component 702.

Memory controller 720 governs interaction between the acceleration component 702 and local memory 722 (such as DRAM memory). The memory controller 720 may perform error correction as part of its services.

Host interface 724 provides functionality that enables acceleration component 702 to interact with a local host component (not shown). In one implementation, the host interface 724 may use Peripheral Component Interconnect Express (PCIe), in conjunction with direct memory access (DMA), to exchange information with the local host component. The outer shell may also include various other features 726, such as clock signal generators, status LEDs, error correction functionality, and so on.

Turning to soft shell 704, router 728 is for routing messages between various internal components of the acceleration component 702, and between acceleration component 702 and external entities (e.g., via a transport component 730). Each such endpoint is associated with a respective port. For example, router 728 is coupled to memory controller 720, host interface 724, application logic 706, and transport component 730.

Transport component 730 formulates packets for transmission to remote entities (such as other acceleration components), and receives packets from the remote entities (such as other acceleration components). A 3-port switch 732, when activated, takes over the function of the bridge 708 by routing packets between the NIC and TOR, and between the NIC or TOR and a local port associated with the acceleration component 702.

Diagnostic recorder 734 can store information regarding operations performed by the router 728, transport component 730, and 3-port switch 732 in a circular buffer. For example, the information may include data about a packet's origin and destination IP addresses, host-specific data, timestamps, etc. A technician may study a log of the information in an attempt to diagnose causes of failure or sub-optimal performance in the acceleration component 702.

A plurality of acceleration components similar to acceleration component 702 can be included in hardware acceleration plane 106.

Acceleration components can use different network topologies (instead of using common network infrastructure 120 for communication) to communicate with one another. In one aspect, acceleration components are connected directly to one another, such as, for example, in a two dimensional torus.

Figure 8:
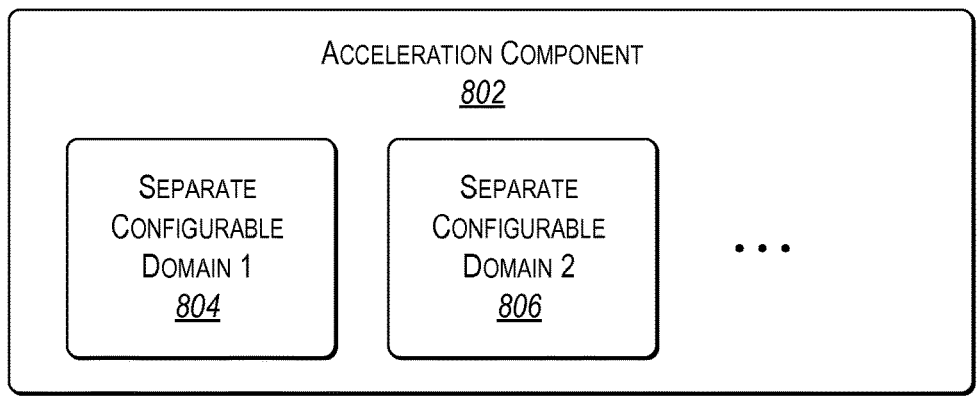
FIG. 8 illustrates an acceleration component including separate configurable domains.

FIG. 8 illustrates an acceleration component 802 including separate configurable domains 804, 806, etc. A configuration component (not shown) can configure each configurable domain without affecting other configurable domains. Hence, the configuration component can configure one or more configurable domains while the other configurable domains are executing operations based on their respective configurations, which are not disturbed.

Figure 9:
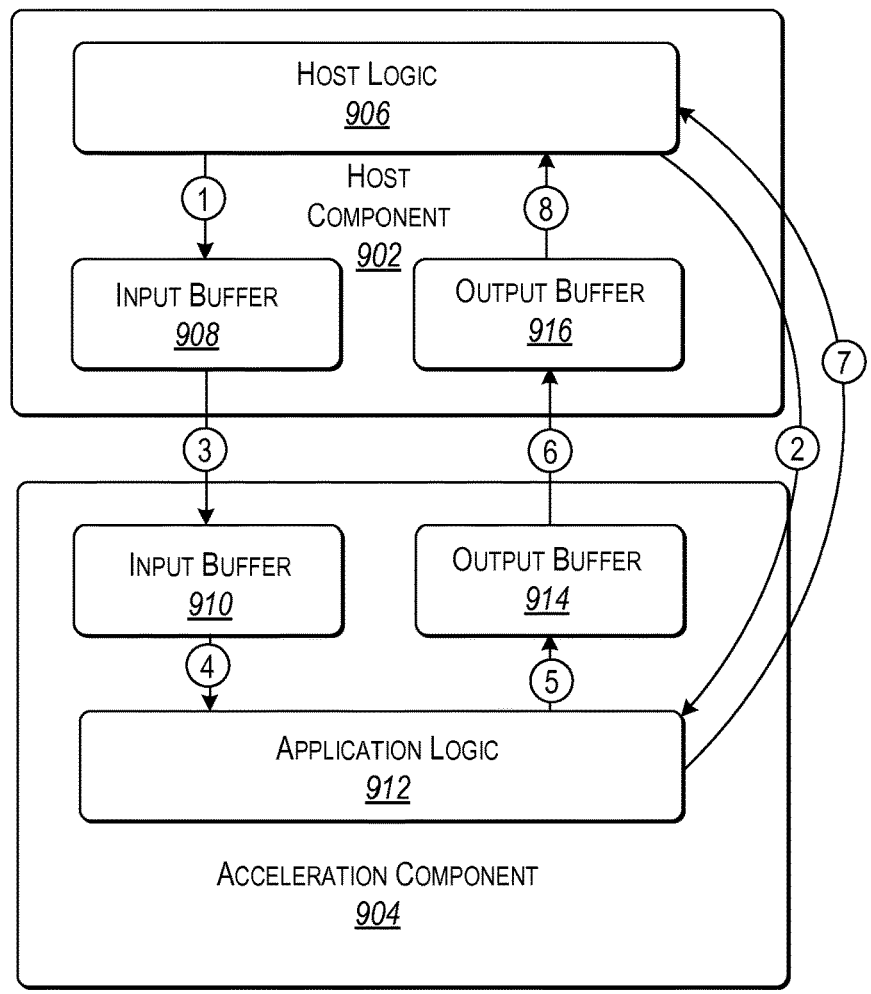
FIG. 9 illustrates functionality for performing data transfer between a local host component and an associated local hardware acceleration component.

FIG. 9 illustrates functionality for performing data transfer between a host component 902 and an associated (e.g., locally linked) acceleration component 904. Data can be transferred via a host interface (e.g., host interface 724), for example, using PCIe in conjunction with DMA memory transfer). In operation (1), host logic 906 places data to be processed into kernel-pinned input buffer 908 in main memory associated with the host logic 906. In operation (2), the host logic 906 instructs the acceleration component 904 to retrieve the data and begin processing it. The host logic's thread is then either put to sleep until it receives a notification event from the acceleration component 904, or it continues processing other data asynchronously. In operation (3), the acceleration component 904 transfers the data from the host logic's memory and places it in an acceleration component input buffer 910.

In operations (4) and (5), the application logic 912 retrieves the data from the input buffer 910, processes it to generate an output result, and places the output result in an output buffer 914. In operation (6), the acceleration component 904 copies the contents of the output buffer 914 into output buffer 916 (in the host logic's memory). In operation (7), acceleration component 904 notifies the host logic 906 that the data is ready for it to retrieve. In operation (8), the host logic thread wakes up and consumes the data in the output buffer 916. Host logic 906 may then discard the contents of the output buffer 916, which allows the acceleration component 904 to reuse it in the next loading operation.

Figure 10:
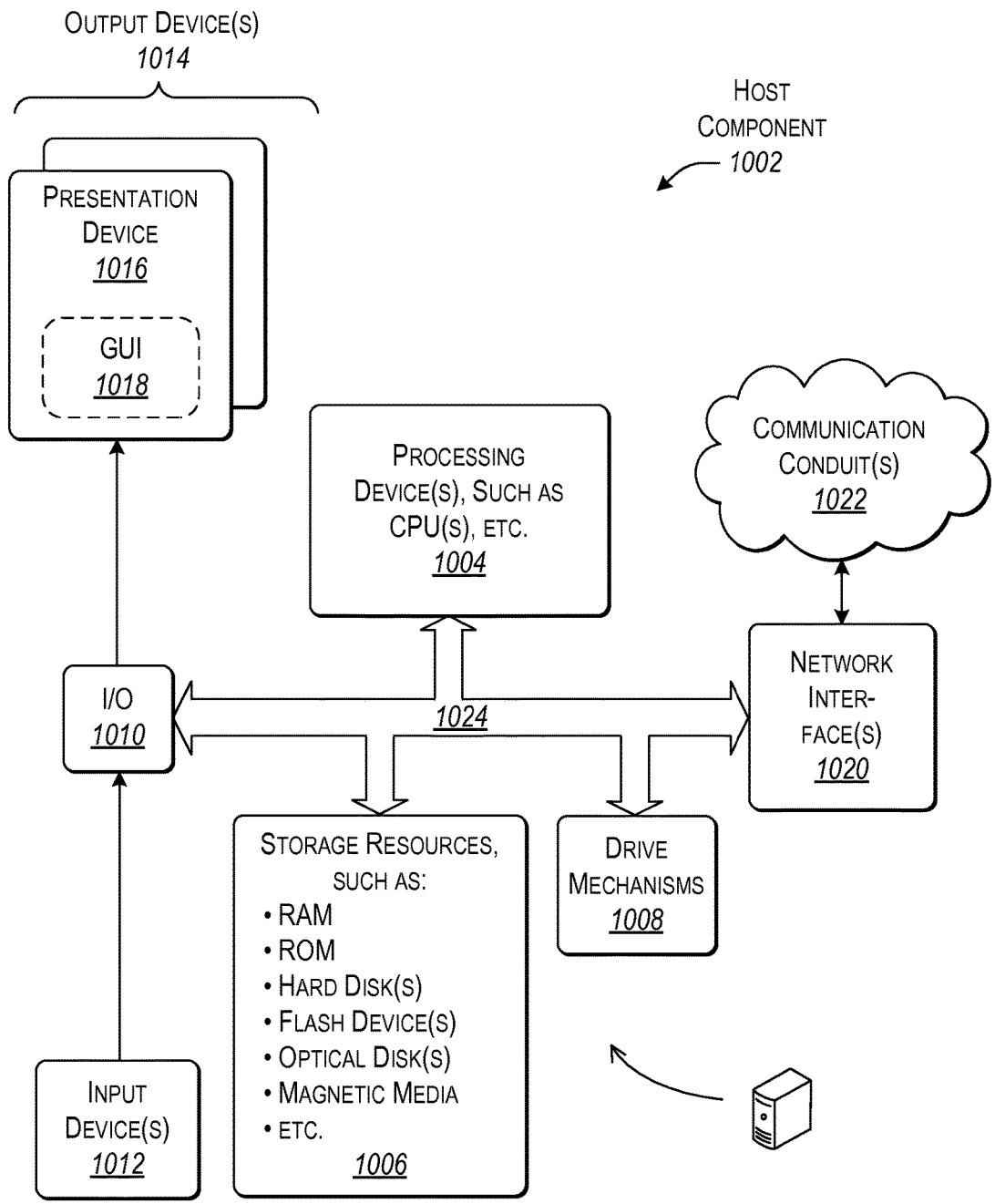
FIG. 10 illustrates an example architecture of a host component.

FIG. 10 illustrates an example architecture of a host component 1002. Host component 1002 can include one or more processing devices 1004, such as one or more central processing units (CPUs). Host component 1002 can also include any storage resources 1006 for storing any kind of information, such as code, settings, data, etc. Without limitation, for instance, storage resources 1006 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of host component 1002. In one case, host component 1002 may perform any of the operations associated with local tenant functionality when processing devices 1004 carry out associated instructions stored in any storage resource or combination of storage resources. Host component 1002 also includes one or more drive mechanisms 1008 for interacting with any storage resource, such as a hard disk drive mechanism, an optical disk drive mechanism, and so on.

Host component 1002 also includes an input/output module 1010 for receiving various inputs (via input devices 1012), and for providing various outputs (via output devices 1014). One particular output mechanism may include a presentation device 1016 and an associated graphical user interface (GUI) 1018. Host component 1002 can also include one or more network interfaces 1020 for exchanging data with other devices via one or more communication conduits 1022. One or more communication buses 1024 communicatively couple the above-described components together.

Communication conduit(s) 1022 can be implemented in any manner, e.g., by a local area network, a wide area network (e.g., the Internet), point-to-point connections, etc., or any combination thereof. Communication conduit(s) 1022 can include any combination of hardwired links, wireless links, routers, gateway functionality, name servers, etc., governed by any protocol or combination of protocols.

A plurality of host components similar to host component 1002 can be included in software plane 104.

Figure 11:
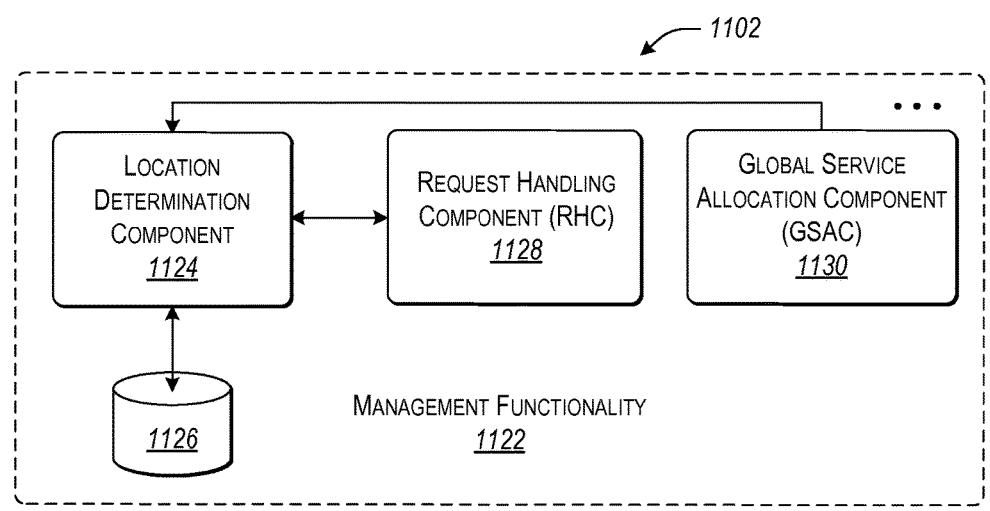
FIG. 11 illustrates an example architecture of management functionality for managing services in a data center.

FIG. 11 illustrates an example architecture 1102 of management functionality 1122 for managing services in a data center. Management functionality 1122 can include a number of sub-components that perform different respective functions (which can be physically implemented in different ways). Architecture 1102 can be included in architecture 102. As such, management functionality 1122 as well as other associated components can be implemented on hardware resources of a host component (e.g., in software plane 104) and/or implemented on hardware resources of an acceleration component (e.g., in hardware acceleration plane 106). Host component hardware resources can include any of the hardware resources associated with host component 1002. Acceleration component hardware resources can include any of the hardware resources associated with acceleration component 702.

A local determination component 1124, for example, can identify the current locations of services within architecture 102, based on information stored in a data store 1126. In operation, location determination component 1124 may receive a request for a service. In response, location determination component 1124 returns an address associated with the service, if that address is present in data store 1126. The address may identify a particular acceleration component in hardware acceleration plane 106 that hosts (or is the head of) the requested service.

Request handling component (RHC) 1128 processes requests for services made by instances of tenant functionality. For example, an instance of tenant functionality may correspond to a software program running on a particular local host component. That software program may request a service in the course of its execution. The RHC 1128 handles the request by determining an appropriate component in architecture 102 to provide the service. Possible components for consideration include: a local acceleration component (associated with the local host component from which the request originated); a remote acceleration component; and/or the local host component itself (whereupon the local host component implements the service in software). RHC 1128 makes its determinations based on one or more request handling considerations, such as whether the requested service pertains to a line-rate service. Further, the RHC 1128 may interact with the location determination component 1124 in performing its functions.

A global service allocation component (GSAC) 1130 can operate in a background and global mode, allocating services to acceleration components based on global conditions in architecture 102 (rather than handling individual requests from instances of tenant functionality, as does RHC 1128). For example, GSAC 1130 may invoke its allocation function in response to a change in demand that affects one or more services. GSAC 1130 makes its determinations based on one or more allocation considerations, such as the historical demand associated with the services, etc. Further, the GSAC 1130 may interact with the location determination component 1124 in performing its functions. A sub-component of GSAC 1130 can also manage multi-component and/or composed services. A multi-component service is a service that is composed of plural parts. Plural respective acceleration components perform the respective parts.

Figure 12:
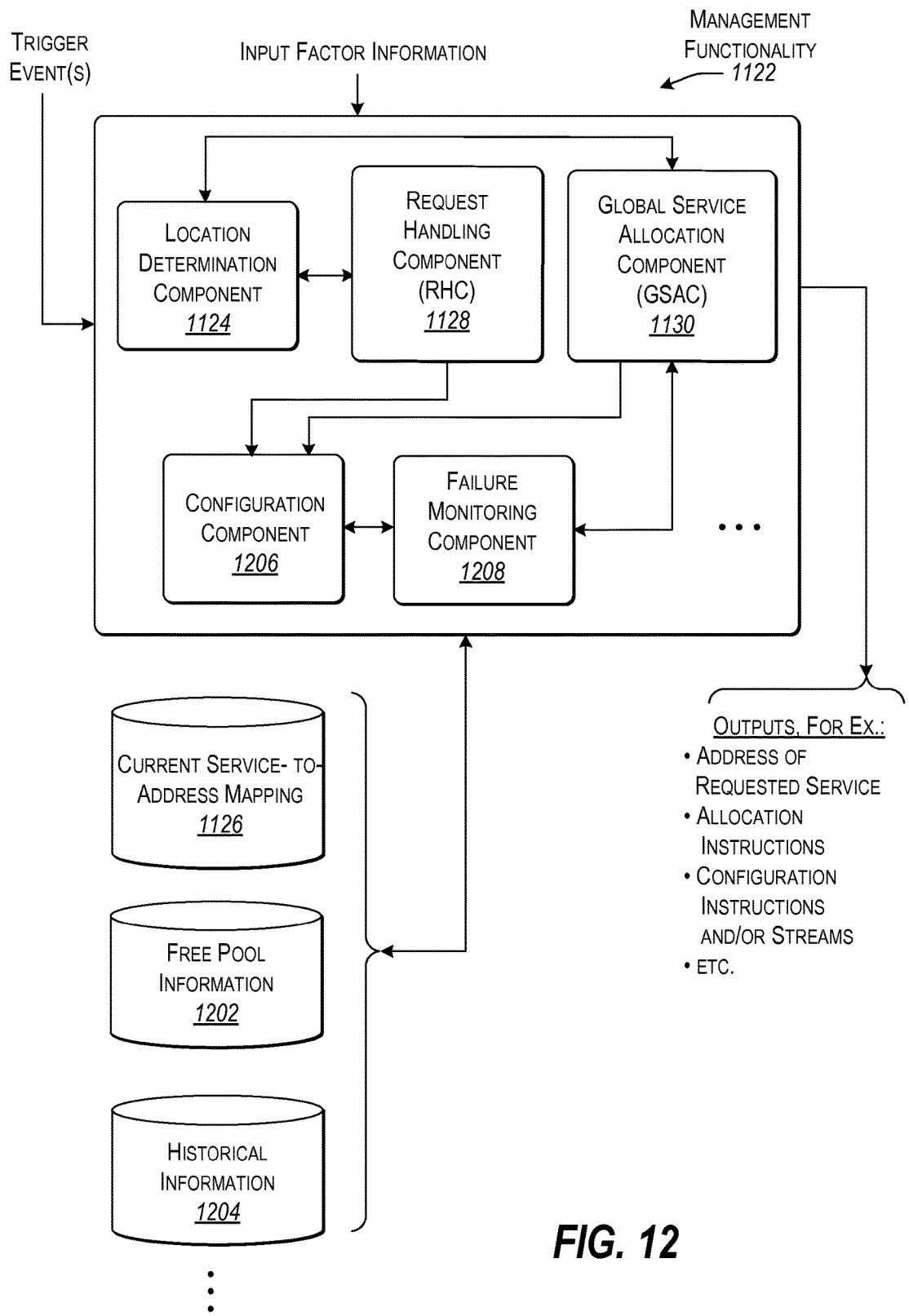
FIG. 12 illustrates an example architecture with additional components of the management functionality of FIG. 11.

FIG. 12 illustrates an example architecture with additional components of management functionality 1122. As described, location determination component 1124 identifies the current location of services within architecture 102, based on information stored in the data store 1126. In operation, the location determination component 1124 receives a request for a service. In response, it returns the address of the service, if present within the data store 1126. The address may identify a particular acceleration component that implements the service.

Request handling component (RHC) 1128 handles requests for services by tenant functionality that resides on the host components. In response to each request by a local host component, RHC 1128 determines an appropriate component to implement the service. For example, RHC 1128 may choose from among: a local acceleration component (associated with the local host component that made the request), a remote acceleration component, or the local host component itself (whereupon the local host component will implement the service in software), or some combination thereof. RHC 1128 performs its determinations based on one or more request handling considerations.

General allocation component (GSAC) 1130, on the other hand, operates by globally allocating services to acceleration components within architecture 102 to meet overall anticipated demand in the data processing system and/or to satisfy other objectives (rather than individual requests by host components). In performing its functions, the GSAC component 1130 may draw on a data store 1202 that provides free pool information. The free pool information identifies acceleration components that have free capacity to implement one or more services. The GSAC 1130 can also receive input information that has a bearing on its allocation decisions. One such piece of input information pertains to historical demand information associated with a service, e.g., as maintained in a data store 1204.

GSAC 1130 and RHC 1128 may use, in part, common logic in reaching their allocation decisions, and that common logic may, in part, taken into account similar allocation considerations. Further, both RHC 1128 and GSAC 1130 interact with the location determination component 124 in the course of performing their respective operations. Otherwise, as described, the GSAC 1130 frames its decisions in a global context, whereas the RHC 1128 is an on-demand component that is primarily focused on satisfying specific requests.

Configuration component 1206 configures acceleration components, e.g., by sending a configuration steam to the acceleration components. A configuration stream specifies the logic (e.g., an image) to be "programmed" into a recipient acceleration component. The configuration component 1206 may use different strategies to configure an acceleration component.

The failure monitoring component 1208 determines whether a previously configured acceleration component has failed. Various components of the management functionality 1122 may respond to failure notification by substituting a spare acceleration component for a failed acceleration component, reconfiguring an acceleration component, partial reconfiguring acceleration component, reloading data in an acceleration component, etc.

As described, functionality for a service or portion thereof can be provided by linking roles from a group of interoperating acceleration components. The linked roles can be composed in a directed graph in any variety of different ways, including a directed acyclic graph, a directed cyclic graph, etc., to provide service functionality and/or acceleration. For example, in some aspects, linked roles are composed in a pipeline or ring.

Figure 13A:
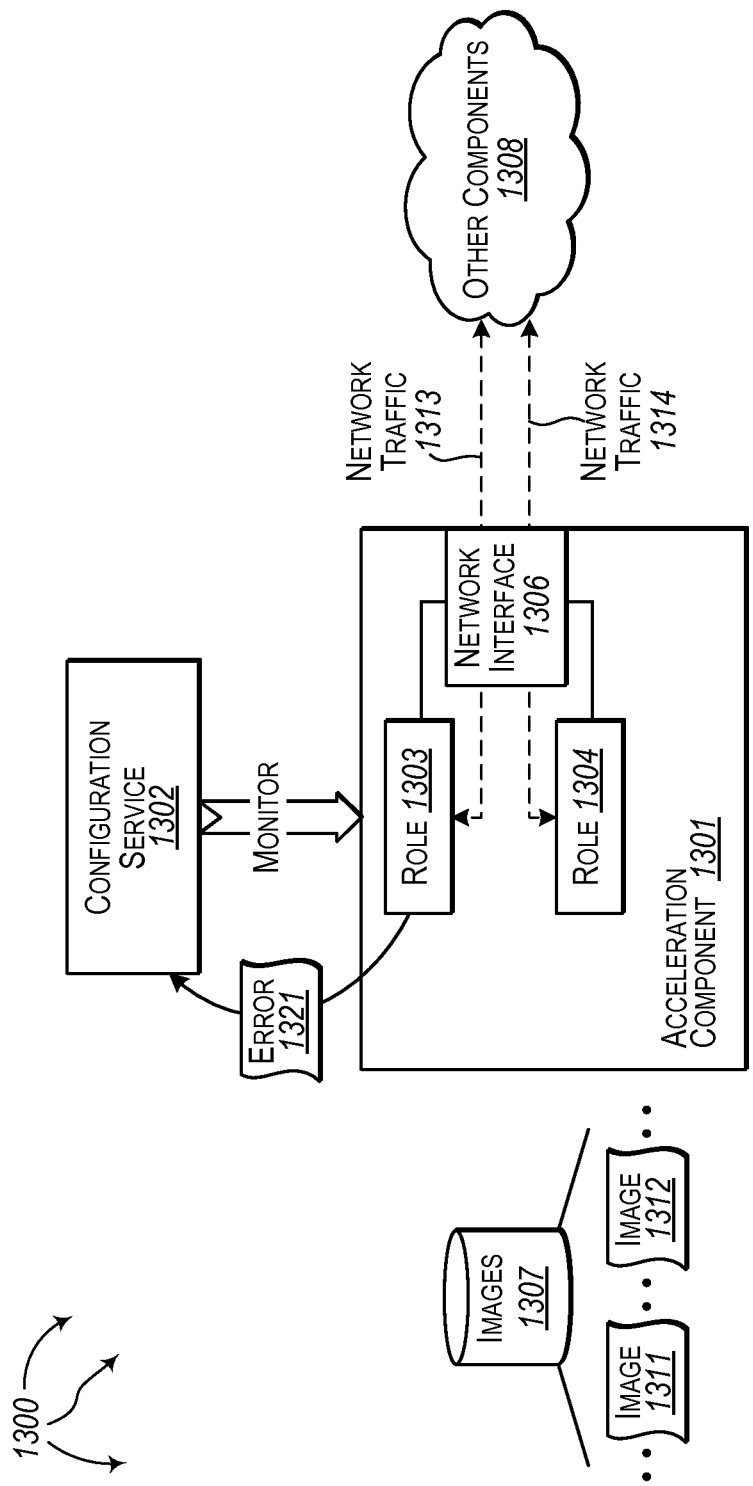
FIGS. 13A-13D illustrate an example architecture that facilitates partially reconfiguring an acceleration component.

FIGS. 13A-13D illustrate an example architecture 1300 that facilitates partially reconfiguring an acceleration component. Referring initially to FIG. 13A, computer architecture 1300 includes acceleration component 1301, configuration service 1302, images 1307, and other components 1308. Acceleration component 1301, configuration service 1302, images 1307, and other components 1308 can be connected to (or be part of) a network, such as, for example, a Local Area Network ("LAN"), a Wide Area Network ("WAN"), and even the Internet. Accordingly, acceleration component 1301, configuration service 1302, images 1307, and other components 1308 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network. In one aspect, acceleration component 1301, configuration service 1302, images 1307, and other components 1308 are connected to network infrastructure 120.

Acceleration component 1301 can include an array of programmable logic blocks and a hierarchy of reconfigurable interconnects that allow logic blocks to be connected together in different configurations (to provide different functionality (i.e., different roles)). Image files can be loaded at acceleration component 1301 to configure programmable logic blocks and configure interconnects to provide desired functionality. Images 1307 include one or more images including images 1311, 1312, etc. Images 1307 can be at a network location and/or local to acceleration component 1031. As such, one or more image files from images 1307 can be loaded at acceleration component 1301 to configure acceleration component 1301 to provide role 1303, role 1304, and network interface 1306.

Acceleration component 1301 can be included in one or more groups of interoperating acceleration components. Within each group of interoperating components, acceleration component 1301 can provide a role. The role can be linked together with roles at other acceleration components in the group of interoperating components to compose a graph providing hardware acceleration for a service. For example, acceleration component 1301 can provide role 1303 to one graph and can provide role 1304 to another different graph.

Other components 1308 can include other acceleration components (e.g., in hardware acceleration plane 106) and host components (e.g., in software plane 104). Network interface 1306 facilitates network communication between role 1303 and other components 1308 and between role 1304 and other components 1308.

For example, role 1303 can exchange network traffic 1313 with other components 1308. Network traffic 1313 can include network traffic originating at role 1303 or network traffic being routed from one component in other components 1308 to another component in other components 1308 (e.g., between components in a graph). Similarly, role 1304 can exchange network traffic 1314 with other components 1308. Network traffic 1314 can include network traffic originating at role 1304 or network traffic being routed from one component in other components 1308 to another component in other components 1308 (e.g., between components in a graph).

Configuration service 1302 can monitor the operation of acceleration component 1301. Configuration service 1302 can be a higher level monitoring service (e.g., on network infrastructure 120), located at a locally linked host component, or even internal to acceleration component 1301. Configuration service 1302 can monitor acceleration component 1301 for incorrect behaviors and/or for functionality that is to be updated. When configuration service 1302 detects incorrect behavior or that an update is appropriate, configuration service 1302 can initiate a partial reconfiguration of acceleration component 1301. Thus, when configuration service 1302 is internal to acceleration component 1301, acceleration component 1301 can self-initiate a partial reconfiguration.

Figure 14:
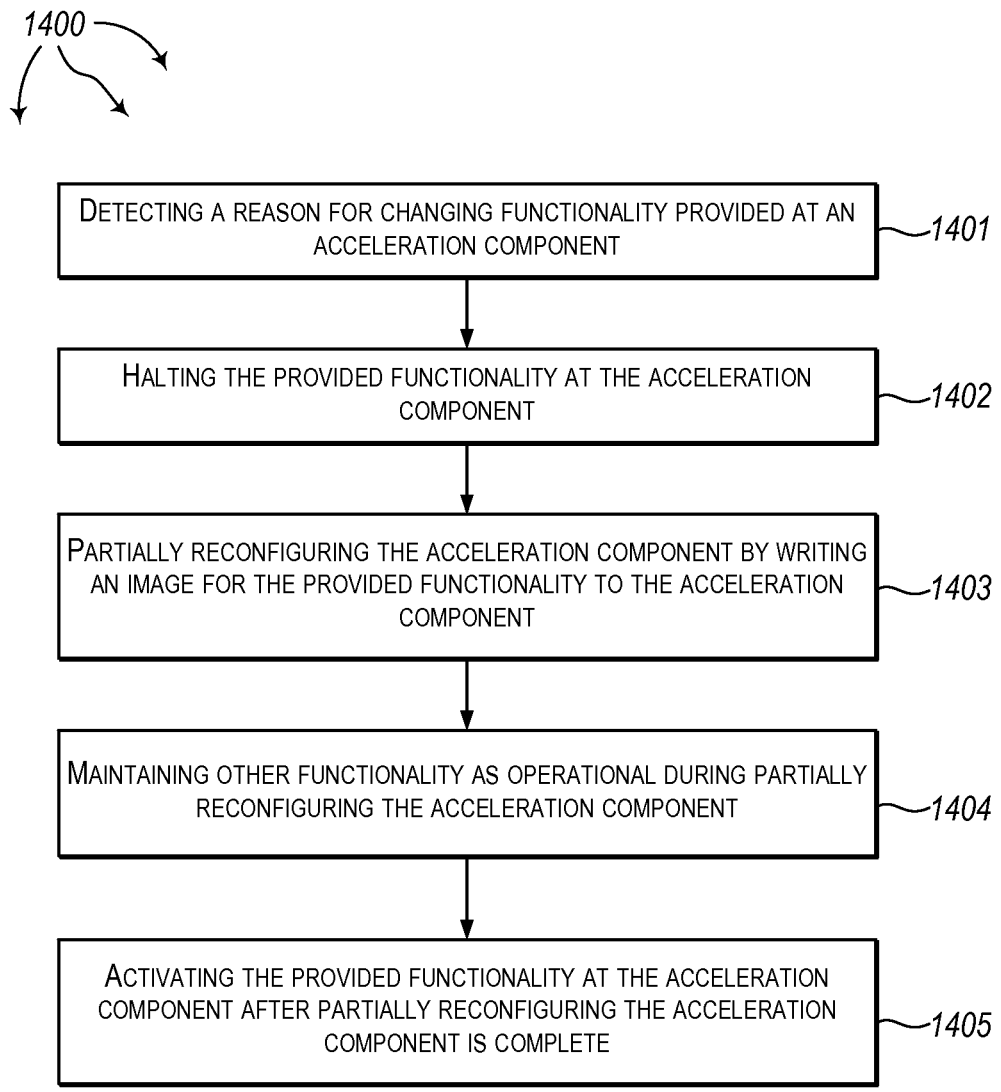
FIG. 14 illustrates a flow chart of an example method for partially reconfiguring an acceleration component.

Turning to FIG. 14, FIG. 14 illustrates a flow chart of an example method 1400 for partially reconfiguring an acceleration component. Method 1400 will be described with respect to the components and data of computer architecture 1300.

Method 1400 includes detecting a reason for changing functionality provided at an acceleration component (1401). For example, configuration service 1302 can detect error 1321 in the operation of role 1303. Alternately, configuration service 1303 can detect that there is an update available for role 1303.

Figure 13B:
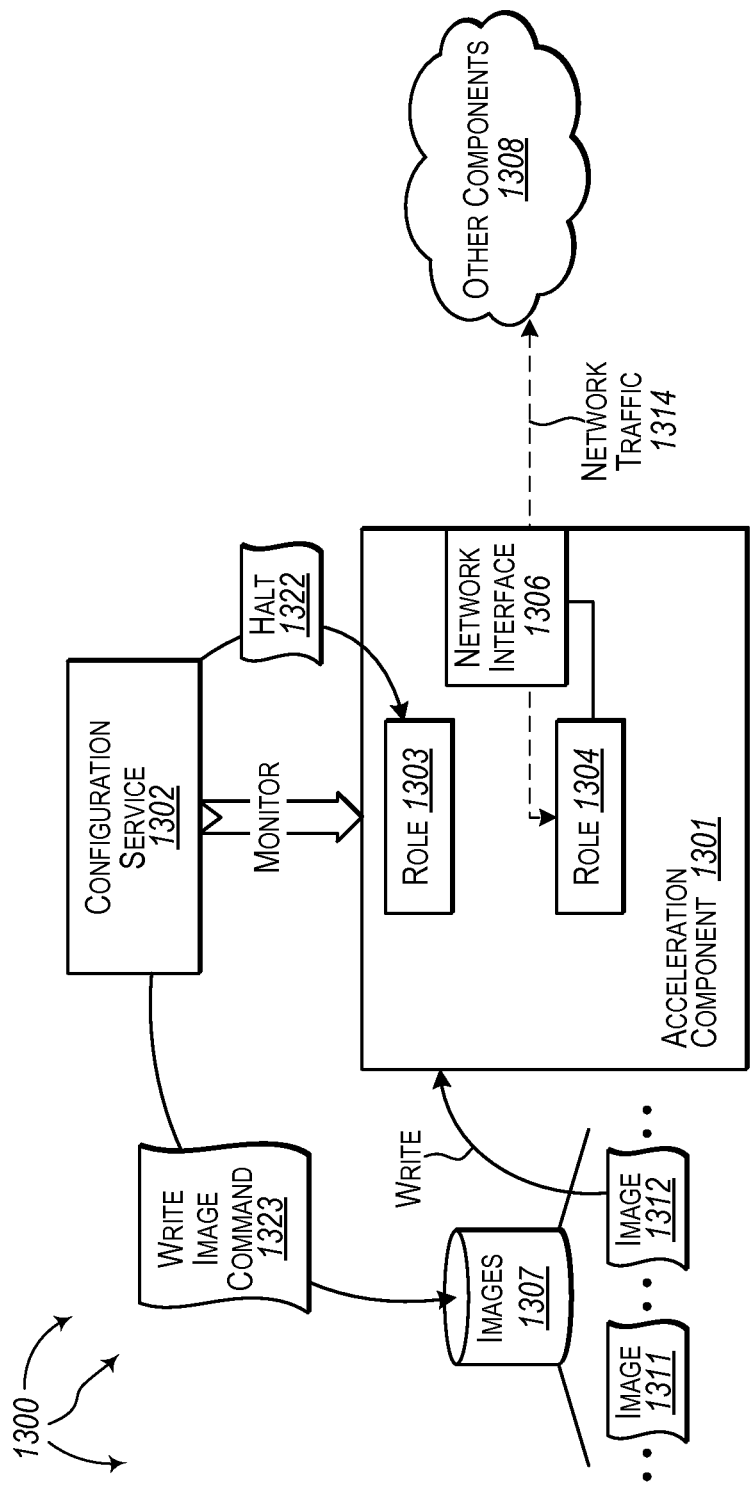
Figure 13C:
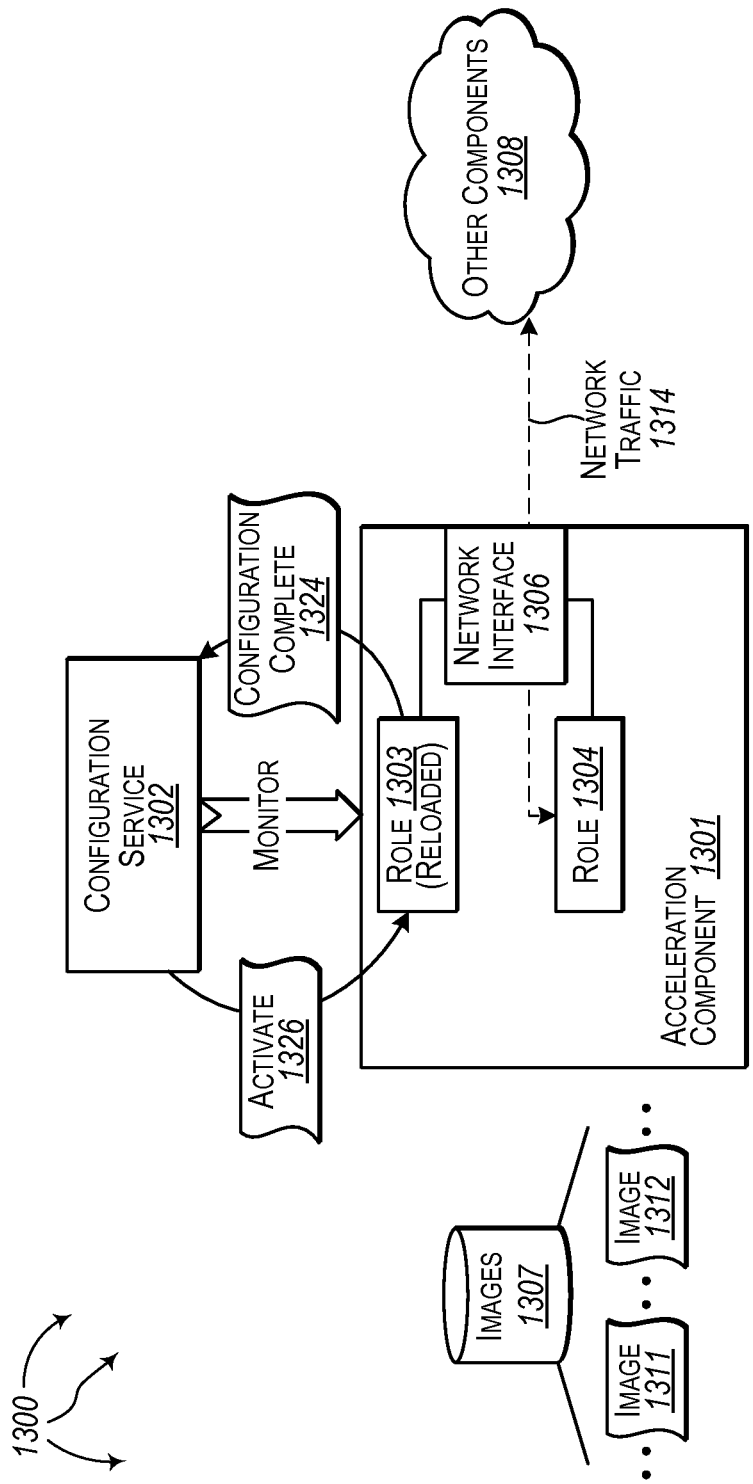

Method 1400 includes halting the provided functionality at the acceleration component (1402). Turning to FIG. 13B, configuration service 1302 sends halt message 1322 to role 1303. In response, role 1303 can halt operation. Halting operation of role 1303 can include halting transmission of data from role 1303 (i.e., telling role 1303 to stop transmitting). When appropriate, configuration service 1302 can also notify upstream and downstream components of role 1303 (e.g., in the same graph) that role 1303 is being halted. When appropriate, configuration service 1302 may also send halt messages to upstream and downstream components of role 1303. The halt messages instruct upstream and stream components of role 1303 to stop receiving data from role 1303 (i.e., to not listen to role 1303). In response, upstream and stream components of role 1303 can stop listening to role 1303. Upstream and downstream components can also take appropriate actions with in-process data (e.g., buffer, drop, send NACKs to other components, etc.) until role 1303 is again operational.

Method 1400 includes partially reconfiguring the acceleration component by writing an image for the provided functionality to the acceleration component (1403). For example, configuration service 1302 can send write image command 1323 to images 1307. Write image command 1323 causes image 1312 to be written from images 1307 to acceleration component 1301. Writing image 1312 to acceleration component 1301 reprograms programmable logic blocks and reconfigurable interconnects to provide role 1303. Reprogramming can address error 1321. Alternately, reprogramming can be used to update role 1303.

Method 1400 includes maintaining other functionality as operational during partially reconfiguring the acceleration component (1404). For example, role 1304 as well as functionality in a shell or soft shell can be maintained as operational during reconfiguration of role 1303. For example, network interface 1306 can be maintained as operational during reconfiguration of role 1303. As such, role 1304 can continue to route network traffic 1314 between acceleration component 1301 and other components 1308 through network interface 1306 during reconfiguration of role 1303.

Method 1400 includes activating the provided functionality at the acceleration component after partially reconfiguring the acceleration component is complete (1405). For example, turning to FIG. 13C, when role 1303 is successfully reloaded, role 1303 (reloaded) can send configuration complete message 1324 to configuration service 1302. In response to configuration complete message 1324, configuration service 1302 can send activate command 1326 to role 1303 (reloaded). In response to activate command 1326, role 1303 (reloaded) can again process data and route network traffic. When appropriate, configuration service 1302 can link role 1303 (reloaded) with upstream and downstream components in a graph and notify the upstream and downstream components that role 1303 (reloaded) is operational. Upstream and downstream components can then take appropriate actions to interoperate with role 1303 (reloaded).

Figure 13D:
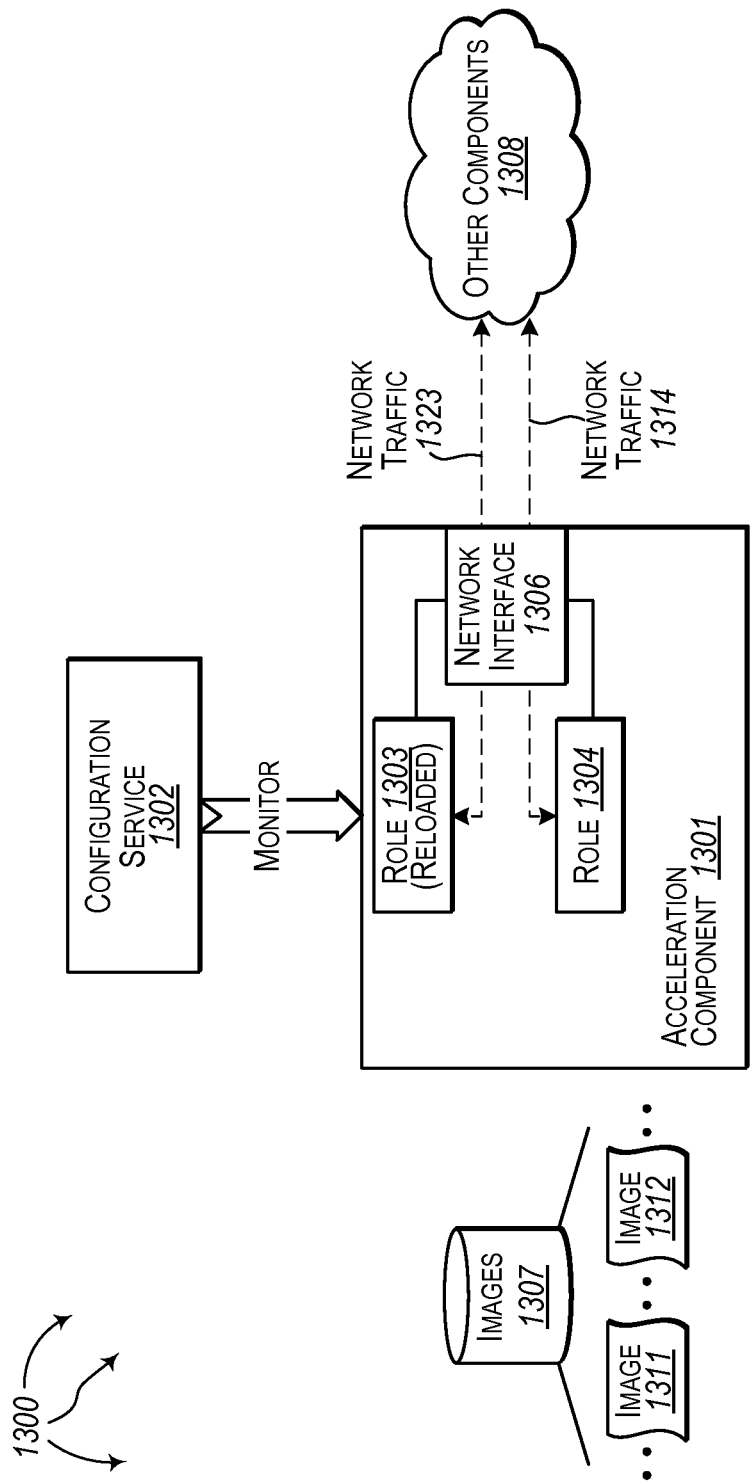

Turning to FIG. 13D, role 1303 (reloaded) can exchange network traffic 1323 with other components 1308. Network traffic 1323 can include network traffic originating at role 1303 (reloaded) or network traffic being routed from one component in other components 1308 to another component in other components 1308 (e.g., between components in a graph).

FIGS. 13A-13D illustrate reconfiguring role 1303 while role 1304 remains operational. During reconfiguration of role 1303, resources associated with a shell (e.g., network interface 1306) and/or a soft shell at acceleration component 1301 can also remain operational. Other aspects include an acceleration component with a single role. In these other aspects, resources associated with a shell and/or soft shell cat at the acceleration component can remain operational while the role is reconfigured or even when a new role is loaded at the acceleration component.

Figure 15A:
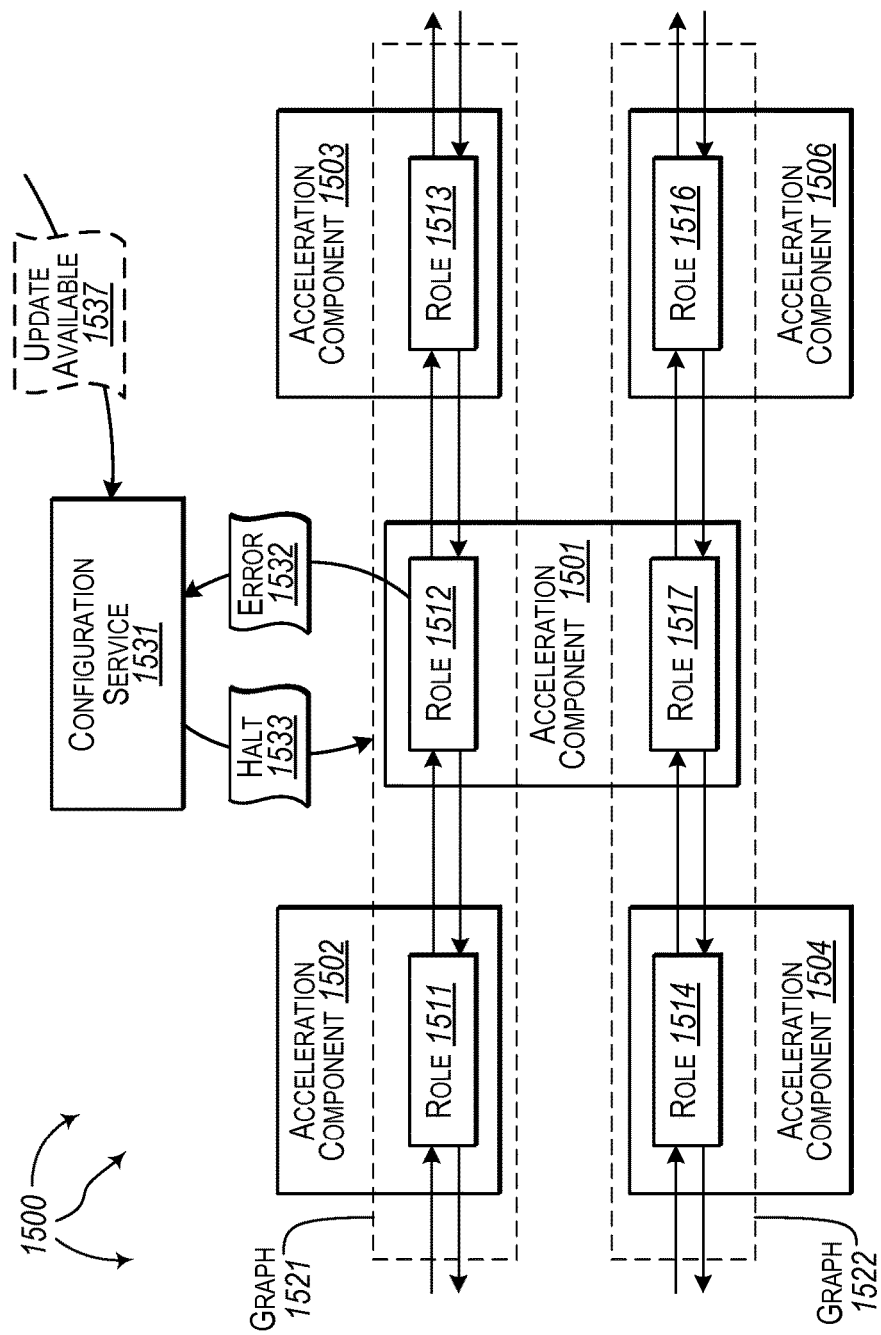
FIGS. 15A-15C illustrate an example architecture that facilitates partially reconfiguring an acceleration component that has roles included in multiple graphs.
Figure 15B:
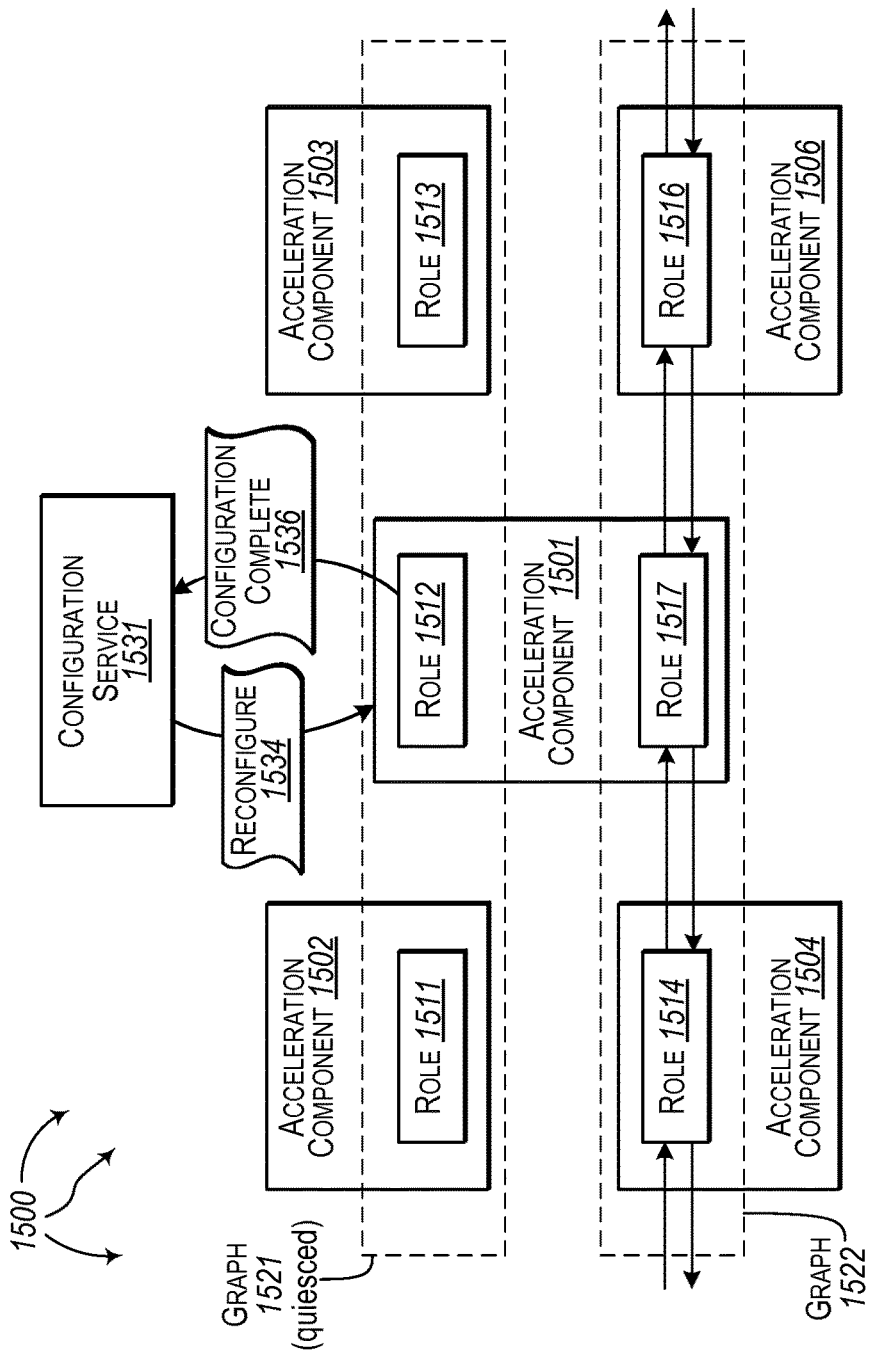
Figure 15C:
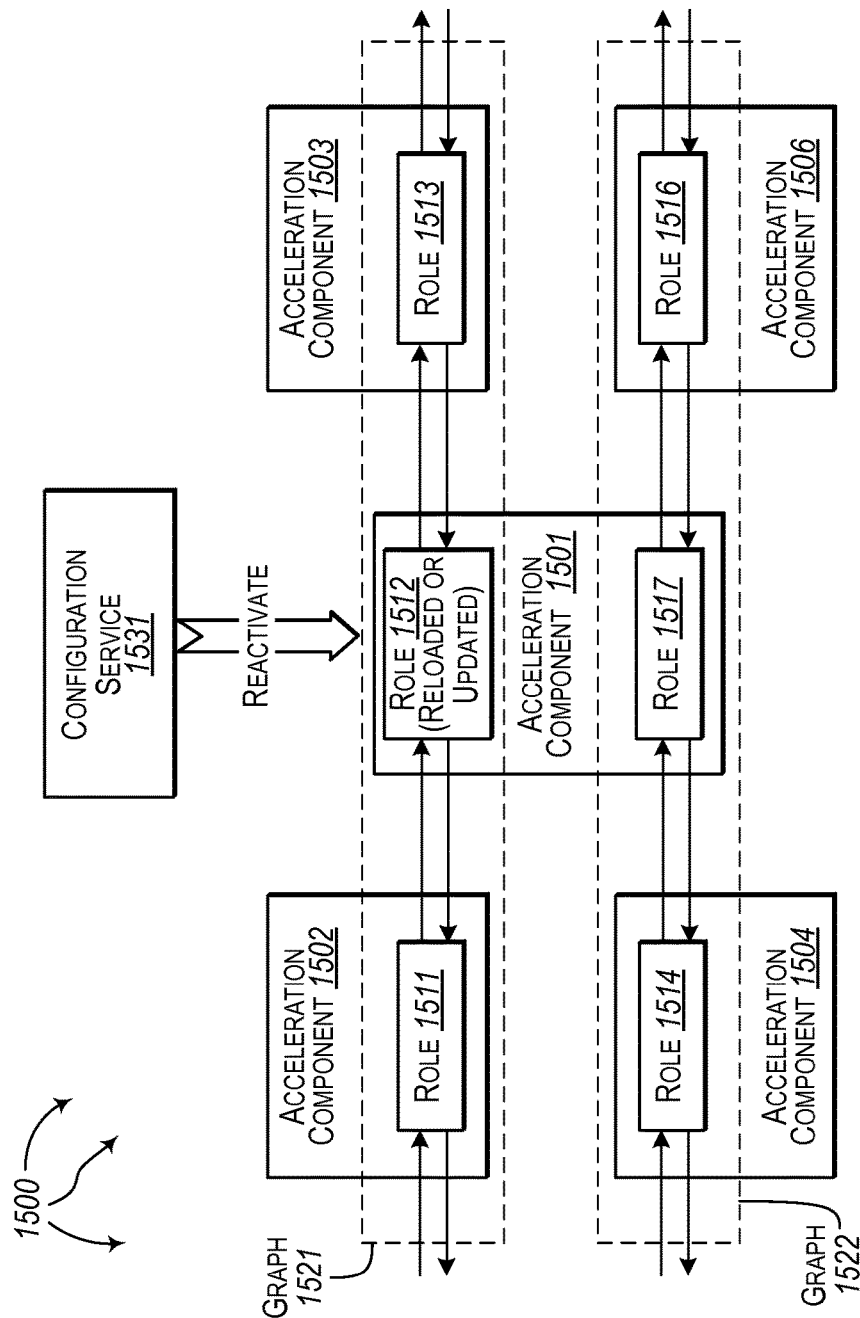

FIGS. 15A-15C illustrate an example architecture 1500 that facilitates partially reconfiguring an acceleration component that has roles included in multiple graphs. As depicted, architecture 1500 includes configuration service 1531 and acceleration components 1501, 1502, 1503, 1504, and 1506. Acceleration components 1501, 1502, 1503, 1504, and 1506 (e.g., FPGAs) can be included in a hardware acceleration plane, such as, hardware acceleration plane 106. The depicted arrangement of acceleration components 1501, 1502, 1503, 1504, and 1506 is logical. The physical proximity of acceleration components 1501, 1502, 1503, 1504, and 1506 to one another can vary (e.g., same server, different servers same rack, different racks, etc.).

Acceleration component 1501 is programmed with roles 1512 and 1517.

Each of acceleration components 1502, 1503, 1504, and 1506 are programmed with a specified role 1511, 1513, 1514, and 1516 respectively. Roles 1511, 1512, and 1513 are linked together to compose graph 1521. Graph 1521 can provide hardware acceleration for a service. Roles 1514, 1517, and 1516 are linked together to compos graph 1522. Graph 1522 can provide hardware acceleration for another different service.

Input and output from roles at (logically) neighboring acceleration components may depend on one another or input and output from other components (e.g., host components or functionality composed from a different group of interoperating acceleration components). For example, input to role 1512 can depend on output from role 1511. Similarly, input to role 1513 can depend on output from role 1512.

Some or all of acceleration components 1501, 1502, 1503, 1504, and 1506 can participate in one-way or two-way communication with (logically) neighboring acceleration components and other components (e.g., host components). Thus, input and output from one acceleration component can depend on input and output from another acceleration component and vice versa. For example, input to role 1511 can depend on output from role 1512 and input to role 1512 can depend on output from role 1513.

A graph can represent a composed grouping of linked roles providing acceleration functionality or a portion thereon. For example, graph 1521 can provide acceleration for part of a document ranking service used to provide search engine results. Graph 1521 can interoperate with other portions of service functionality composed from other groups of interoperating acceleration components and/or provided by one or more host components. For example, for a document ranking service, document feature extraction can be composed from one group of interoperating acceleration components, free form expression calculations can be composed from another group of interoperating acceleration components, and scoring calculations can be composed from a further group of interoperating acceleration components.

Graph 1522 can provide acceleration for another part of the document ranking service or can provide acceleration for some other service (e.g., encryption, compression, computer vision, speech translation, machine learning, etc.).

Configuration service 1531 can monitor the other components depicted in architecture 1500. During monitoring, configuration service 1531 can detect error 1532 in role 1512. Alternately, configuration service 1531 can detect update available message 1537 indicating that there is an update available for role 1512. In response, configuration service 1531 can send halt command 1533 to graph 1521.

Halt command 1533 halts operation of role 1512 as well as quiescing graph 1521. Quiescing graph 1521 stops all network traffic flowing into and out of graph 1521. Halt command 1533 also instructs roles 1511 and 1513 to ignore any data coming out of role 1512.

Turning to FIG. 13B, when graph 1521 is quiesced, configuration service 1531 can send reconfigure command 1534 to acceleration component 1501 to cause acceleration component 1501 to reconfigure the functionality of role 1512. Role 1512 can be reconfigured to correct an error or failure, to update, etc. Reconfiguring role 1512 can include reloading a new image (either of role 1512 or an updated role 1512) on acceleration component 1501.

During reconfiguration of role 1512 (e.g., during processing of an image file), other roles at acceleration component 1501 can continue to operate as intended while role 1512 is reconfigured. For example, role 1517 can continue to interoperate and exchange network traffic with other roles in graph 1522 during reconfiguration of role 1512. Thus, an image for one role can be loaded onto acceleration component 1501 without overwriting images for other roles or overwriting a network interface.

When reconfiguration of role 1512 is complete, role 1512 can send configuration complete message 1536 to configuration service 1531. Turning to FIG. 15C, configuration service 1531 can then re-integrate role 1512 (reloaded or updated) into graph 1521 and reactivate graph 1521.

Figure 16:
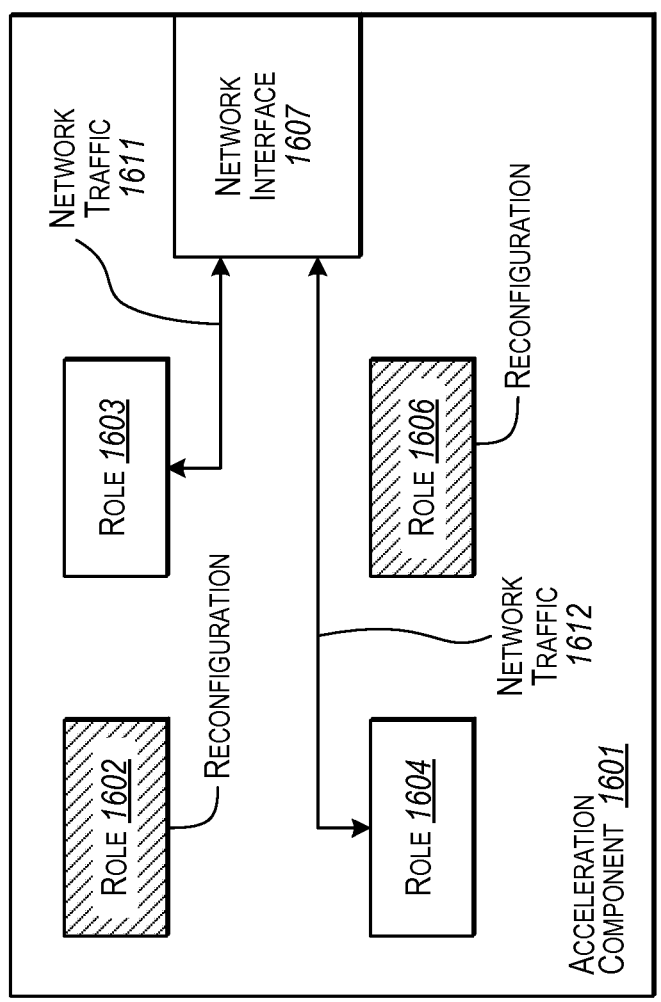
FIG. 16 illustrates an example of partially reconfiguring an acceleration component.

Turning to FIG. 16, FIG. 16 illustrates an example of partially reconfiguring an acceleration component 1601. As depicted, acceleration component 1601 includes roles 1602, 1603, 1604, and 1606 and network interface 1607. Roles 1602 and 1606 are being reconfigured. Roles 1603 and 1604 can exchange network traffic 1611 and 1612 respectively with other components through network interface 1607 while roles 1602 and 1606 are being reconfigured.

In general, the described aspects are advantageous for reconfiguring part of an acceleration component without impacting other parts of the acceleration component. Partial reconfiguration of an acceleration component can also be performed more quickly than full reconfiguration of an acceleration component.

In some aspects, a system includes a hardware acceleration plane, a software plane, and a network infrastructure. The hardware acceleration plane includes a configurable fabric of a plurality of acceleration components (e.g., hardware accelerators, such as, FPGAs). The software plane includes a plurality of host components (e.g., CPUs) running software. The network infrastructure is shared by acceleration components in the hardware acceleration plane and host components in the software plane. The network infrastructure is used by acceleration components to communicate directly with one another. Local links connect acceleration components and host components (e.g., in the same server).

The system also includes one or more computer storage devices having stored thereon computer-executable instructions representing a configuration service, the configuration service is configured to reconfigure acceleration components. Reconfiguring acceleration components includes detecting a reason for reconfiguring an acceleration component (e.g., detecting an error or detecting an available update). The acceleration component is included in and providing functionality to a group of interoperating acceleration components (included in the hardware acceleration plane) that provide acceleration of a service. Functionality at each acceleration component in the group of interoperating acceleration components is composed together in a graph to provide the service acceleration. The acceleration component has other functionality in addition to the provided functionality.

Reconfiguring acceleration components includes halting the provided functionality at the acceleration component. Reconfiguring acceleration components includes partially reconfiguring the acceleration component by writing an image for the provided functionality to the acceleration component (e.g., to address an error or install an update).

Reconfiguring acceleration components includes maintaining other functionality as operational during partially reconfiguring the acceleration component. Maintaining other functionality as operational can include maintaining other roles, maintaining functionality in a soft shell, or maintaining functionality in a shell. Maintained functionality can include functionality that is provided to one or more other groups of acceleration components composed together in graphs to accelerate other services. For example, maintaining functionality can include routing network traffic between the acceleration component and at least one other component during partially reconfiguring the acceleration component. Reconfiguring acceleration components includes activating the provided functionality at the acceleration component after partially reconfiguring the acceleration component is complete.

In another aspect, a method for partially reconfiguring an acceleration component is performed. A reason for changing functionality provided by an acceleration component is detected (e.g., detecting an error or detecting an available update). The provided functionality at the acceleration component is halted. The acceleration component is partially reconfigured by writing an image for the provided functionality to the acceleration component (e.g., to address an error or install an update).

Other functionality is maintained as operational during partially reconfiguring the acceleration component. Maintaining other functionality can include maintaining other roles, maintaining functionality in a soft shell, or maintaining functionality in a shell. Maintained functionality can include functionality that is provided to one or more other groups of acceleration components composed together in graphs to accelerate other services As such, maintaining functionality can include routing network traffic between the acceleration component and at least one other hardware component during partially reconfiguring the acceleration component. The provided functionality is activated at the acceleration component after partially reconfiguring the acceleration component is complete.

In another aspect, a computer program product for use at a computer system includes one or more computer storage devices having stored thereon computer-executable instructions that, in response to execution at a processor, cause the computer system to implement a method for partially reconfiguring an acceleration component (e.g., a hardware accelerator, such as, an FPGA).

The computer program product includes computer-executable instructions that, in response to execution at a processor, cause the computer system to detect a reason for changing the provided functionality (e.g., detecting an error or detecting an available update). The computer program product includes computer-executable instructions that, in response to execution at a processor, cause the computer system to halt the provided functionality at the acceleration component. The computer program product includes computer-executable instructions that, in response to execution at a processor, cause the computer system to partially reconfigure the acceleration component by writing an image for the provided functionality to the acceleration component (e.g., to address an error or install an update).

The computer program product includes computer-executable instructions that, in response to execution at a processor, cause the computer system to maintain other functionality as operational during partially reconfiguring the acceleration component. Maintaining other functionality can include maintaining other roles, maintaining functionality in a soft shell, or maintaining functionality in a shell. Maintained functionality can include functionality that is provided to one or more other groups of acceleration components composed together in graphs to accelerate other services As such, maintaining functionality can include routing network traffic between the acceleration component and at least one other component during partially reconfiguring the acceleration component. The computer program product includes computer-executable instructions that, in response to execution at a processor, cause the computer system to activate the provided functionality at the acceleration component after partially reconfiguring the acceleration component is complete.

The described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A method for partially reconfiguring an acceleration component programmed with a role, the role linked via an area network to one or more of: a downstream role at a downstream neighbor acceleration component and an upstream role at an upstream neighbor acceleration component to compose a graph providing an instance of service acceleration, the method comprising:
   detecting a reason for changing the role;
   halting the role, including instructing at least one of: the downstream role and the upstream role to stop receiving data from the role;
   partially reconfiguring the acceleration component by writing an image for the role to the acceleration component;
   maintaining a network interface programmed into the acceleration component and a second role programmed into the acceleration component as operational during partially reconfiguring the acceleration component, maintaining the network interface permitting the second role to exchange network communication via the area network with one or more other roles at other acceleration components, the second role linked to the one or more other roles to compose another graph providing another instance of service acceleration, wherein the graph provides service acceleration for a service selected from among: document ranking, data encryption, data compression, speech translation, computer vision, or machine learning; and
   activating the role at the acceleration component after partially reconfiguring the acceleration component is complete, including notifying the at least one of: the downstream role and the upstream role that the role is operational.

2. The method of claim 1, wherein detecting a reason for changing the role comprises detecting an error in the role.

3. The method of claim 2, wherein partially reconfiguring the accelerator component comprises writing an image for the role to the acceleration component to address the error at the acceleration component.

4. The method of claim 1, wherein detecting a reason for changing the role comprises detecting that there is an update available for the role.

5. The method of claim 4, wherein partially reconfiguring the acceleration component comprises writing an image for the update to a hardware accelerator to update the role at the hardware accelerator.

6. The method of claim 1, further comprising maintaining functionality of one or more additional resources at the acceleration component during partial reconfiguration of the acceleration component.

7. The method of claim 1, wherein maintaining the network interface as operational during partially reconfiguring the acceleration component comprises routing network traffic by:
receiving some network traffic from another component via the network interface; and
sending other network traffic to a further component via the network interface.

8. The method of claim 1, wherein the acceleration component comprises a hardware accelerator.

9. The method of claim 1, wherein the acceleration component is included in a configurable fabric of a plurality of Field Programmable Gate Arrays (FPGAs).

10. A computer program product for use at a computer system, the computer program product for implementing a method for partially reconfiguring an acceleration component programmed with a role, the role linked via an area network to one or more of: a downstream role at a downstream neighbor acceleration component and an upstream role at an upstream neighbor acceleration component to compose a graph providing an instance of service acceleration, the computer program product comprising one or more computer storage devices having stored thereon computer-executable instructions that, in response to execution at a processor, cause the method to be performed, comprising:
detect a reason for changing the role;
halt the role, including instructing at least one of: the downstream role and the upstream role to stop receiving data from the role;
partially reconfigure the acceleration component by writing an image for the role to the acceleration component;
maintain a network interface programmed into the acceleration component and a second role programmed into the acceleration component as operational during partially reconfiguring the acceleration component, maintaining the network interface permitting the second role to exchange network communication via the area network with one or more other roles at other acceleration components, the second role linked to the one or more other roles to compose another graph providing another instance of service acceleration, wherein the graph provides service acceleration for a service selected from among: document ranking, data encryption, data compression, speech translation, computer vision, or machine learning; and
activate the role at the acceleration component after partially reconfiguring the acceleration component is complete, including notifying the at least one of: the downstream role and the upstream role that the role is operational.

11. The computer program product of claim 10, wherein computer-executable instructions that, in response to execution, detect a reason for changing the role comprise computer-executable instructions that, in response to execution, detect an error in the role; and
wherein computer-executable instructions that, in response to execution, partially reconfigure the acceleration component comprise computer-executable instructions that, in response to execution, write an image for the role to the acceleration component to address the error at the acceleration component.

12. The computer program product of claim 10, wherein computer-executable instructions that, in response to execution, detect a reason for changing the role comprise computer-executable instructions that, in response to execution, detect that there is an update available for the role; and
wherein computer-executable instructions that, in response to execution, partially reconfigure the acceleration component comprise computer-executable instructions that, in response to execution, write an image for the update to the acceleration component to update the role at the acceleration component.

13. A system, the system including:
a hardware acceleration plane including a plurality of configurable acceleration components;
one or more computer storage devices having stored thereon computer-executable instructions that when executed by a processor perform the following at an acceleration component included in the plurality of configurable acceleration components:
detect a reason for changing a role at the acceleration component, the acceleration component programmed with the role and a network interface, the role linked to one or more of: a downstream role at a downstream neighbor acceleration component and an upstream role at an upstream neighbor acceleration component to compose a graph providing an instance of service acceleration;
halt the role at the acceleration component, including instructing at least one of: the downstream role and the upstream role to stop receiving data from the role;
partially reconfigure the acceleration component by writing an image for the role to the acceleration component;
maintain a network interface programmed into the acceleration component and a second role programmed into the acceleration component as operational during partially reconfiguring the acceleration component, maintaining the network interface permitting the second role to exchange network communication via the area network with one or more other roles at other acceleration components, the second role linked to the one or more other roles to compose another graph providing another instance of service acceleration, wherein the graph provides service acceleration for a service selected from among: document ranking, data encryption, data compression, speech translation, computer vision, or machine learning; and
activate the role at the acceleration component after partially reconfiguring the acceleration component is complete, including notifying the at least one of: the downstream role and the upstream role that the role is operational.

14. The system of claim 13, wherein the plurality of configurable acceleration components comprises a plurality of Field Programmable Gate Arrays (FPGAs).

15. The system of claim 13, further comprising local links locally connecting acceleration components to host components.

16. The system of claim 14, wherein computer-executable instructions that when executed by a processor detect a reason for changing the role comprise computer-executable instructions that when executed by a processor detect one of: an error in the role or an available update for the role.

17. The system of claim 14, wherein computer-executable instructions that when executed by a processor maintain the network interface as operational during partially reconfiguring the acceleration component comprise computer-executable instructions that when executed by a processor maintain routing of network traffic between other components during partially reconfiguring the acceleration component including:
- receiving some network traffic from another component via the network interface; and
- sending other network traffic to a further component via the network interface.

* * * * *